US010587012B2

(12) United States Patent
Meng et al.

(10) Patent No.: US 10,587,012 B2
(45) Date of Patent: Mar. 10, 2020

(54) ELECTROLYTE COMPOSITIONS COMPRISING IONIC LIQUIDS AND METAL HYDRIDE BATTERIES COMPRISING SAME

(71) Applicant: BASF Corporation, Florham Park, NJ (US)

(72) Inventors: Tiejun Meng, Novi, MI (US); Kwo Young, Troy, MI (US); Diana Wong, Sterling Heights, MI (US); Jean Nei, Southgate, MI (US)

(73) Assignee: BASF Corporation, Florham Park, NJ (US)

( * ) Notice: Subject to any disclaimer, the term of this patent is extended or adjusted under 35 U.S.C. 154(b) by 594 days.

(21) Appl. No.: 14/669,588

(22) Filed: Mar. 26, 2015

(65) Prior Publication Data

US 2016/0285130 A1   Sep. 29, 2016

(51) Int. Cl.
*H01M 10/34* (2006.01)
(52) U.S. Cl.
CPC .... *H01M 10/345* (2013.01); *H01M 2300/004* (2013.01); *H01M 2300/0005* (2013.01); *H01M 2300/0014* (2013.01); *H01M 2300/0037* (2013.01); *H01M 2300/0045* (2013.01)

(58) Field of Classification Search
None
See application file for complete search history.

(56) References Cited

U.S. PATENT DOCUMENTS

| | | | | |
|---|---|---|---|---|
| 5,856,047 | A * | 1/1999 | Venkatesan | B60K 6/28 429/245 |
| 6,045,948 | A * | 4/2000 | Wang | H01M 10/0567 429/199 |
| 6,198,622 | B1 * | 3/2001 | Nitta | H01G 9/022 361/504 |
| 2006/0046150 | A1 * | 3/2006 | Kashida | H01M 10/0525 429/302 |
| 2007/0212615 | A1 * | 9/2007 | Jost | H01M 10/0567 429/326 |
| 2012/0082903 | A1 | 4/2012 | Zhang et al. | |
| 2012/0321970 | A1 | 12/2012 | Friesen et al. | |
| 2013/0029232 | A1 | 1/2013 | Zheng et al. | |
| 2013/0084474 | A1 * | 4/2013 | Mills | H01M 4/9016 429/9 |
| 2013/0244094 | A1 | 9/2013 | Giroud et al. | |
| 2013/0273402 | A1 * | 10/2013 | Tsutsumi | H01M 4/48 429/99 |
| 2013/0277607 | A1 | 10/2013 | Young et al. | |
| 2013/0302704 | A1 | 11/2013 | Visco et al. | |
| 2013/0323571 | A1 | 12/2013 | Dai et al. | |
| 2013/0344399 | A1 | 12/2013 | Sutto | |
| 2014/0087214 | A1 | 3/2014 | Amatucci et al. | |
| 2014/0168855 | A1 | 6/2014 | Galiano et al. | |
| 2014/0199591 | A1 * | 7/2014 | Geng | H01M 4/366 429/213 |
| 2014/0356702 | A1 | 12/2014 | Hayashi | |
| 2016/0141725 | A1 | 5/2016 | Young et al. | |
| 2016/0141726 | A1 | 5/2016 | Young et al. | |
| 2016/0141727 | A1 * | 5/2016 | Young | H01M 10/345 429/163 |

FOREIGN PATENT DOCUMENTS

| | | |
|---|---|---|
| CN | 101752628 | 6/2010 |
| EP | 3107144 A1 | 12/2016 |
| JP | 2001322817 | 11/2001 |
| JP | 2001322817 A | 11/2001 |
| JP | 2006202646 A | 8/2006 |
| JP | 2006344433 | 12/2006 |
| JP | 2007250994 A | 9/2007 |
| JP | 2012190929 A | 10/2012 |
| JP | 2013051065 A | 3/2013 |
| JP | 5648772 B1 | 1/2015 |
| WO | 9411910 A1 | 5/1994 |
| WO | WO1994011910 | 5/1994 |
| WO | WO2014088710 | 6/2014 |

OTHER PUBLICATIONS

U.S. Appl. No. 14/540,445, filed Nov. 13, 2014.
International Search Report for PCT/US2016/023503 dated Jun. 21, 2016.
Supplementary Partial European Search Report for Application No. 16769531.1 dated Aug. 30, 2018.
Extended European Search Report for Application No. 16769531.1 dated Jan. 21, 2019.

\* cited by examiner

*Primary Examiner* — Ula C Ruddock
*Assistant Examiner* — Tony S Chuo
(74) *Attorney, Agent, or Firm* — Dinsmore & Shohl LLP; Weston R. Gould

(57) ABSTRACT

Electrolyte compositions comprising a) an ionic liquid and b) a protic acid and/or an organic solvent are suitable for use in electrochemical cells, e.g. metal hydride batteries. The electrolyte compositions may replace the currently employed 30% by weight aqueous KOH. Suitable protic acids include carboxylic acids, mineral acids, sulfonic acids and the like. Suitable organic solvents include organic carbonates, ethers, glymes, ortho esters, polyalkylene glycols, esters, lactones, glycols, formates, sulfones, sulfoxides, amides, alcohols, ketones, nitro solvents, nitrile solvents and combinations thereof. Present batteries may achieve a nominal open-circuit voltage of >1.2 V (volts) and up to about 6 V. The electrolyte compositions allow enlargement of the electrochemical window, thus allowing the use of further cathode active materials. Further cathode active materials include transition metals and their oxides, hydroxides and fluorides; for example, Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt and Au and their oxides, hydroxides, oxide/hydroxides and fluorides.

23 Claims, No Drawings

ELECTROLYTE COMPOSITIONS COMPRISING IONIC LIQUIDS AND METAL HYDRIDE BATTERIES COMPRISING SAME

GOVERNMENT SUPPORT STATEMENT

This invention was made with government support under DE-AR0000386 awarded by Advanced Research Projects Agency-Energy. The government has certain rights in the invention.

The present invention is aimed at metal hydride (MH) batteries containing certain electrolyte compositions.

Much progress has been made in optimizing the electrochemical performance and cycle life of metal hydride batteries through optimization of the electrodes. The electrolyte of metal hydride batteries is presently 30% by weight aqueous KOH. The aqueous KOH electrolyte is corrosive to some electrode materials. Aqueous electrolyte is also limited by the hydrogen and oxygen evolution potential of water. The present invention is focused on improved electrolytes.

SUMMARY OF THE INVENTION

Disclosed is a metal hydride battery (cell) comprising at least one negative electrode, at least one positive electrode, a casing having said electrodes positioned therein and an electrolyte composition, where the electrolyte composition comprises
a) an ionic liquid and
b) a protic acid and/or an organic solvent.

Also disclosed is metal hydride battery (cell) comprising at least one negative electrode, at least one positive electrode, a casing having said electrodes positioned therein and an electrolyte composition, where the positive electrode comprises one or more cathode active materials selected from the group consisting of
transition metals, transition metal oxides, transition metal hydroxides, transition metal oxide/hydroxides and transition metal fluorides;
where in the metal oxides, metal hydroxides and metal oxide/hydroxides, nickel may be present at a level of for example ≤50 or ≤80 or ≤85 atomic percent, for instance ≤90 atomic percent, based on the total metals of the metal oxides, metal hydroxides and metal oxide/hydroxides.

Also disclosed is an electrolyte composition comprising
a) an ionic liquid and
b) a protic acid and/or an organic solvent.

Also disclosed is a metal hydride battery (cell) comprising at least one negative electrode, at least one positive electrode, a casing having said electrodes positioned therein and an electrolyte composition, which battery exhibits a nominal open-circuit voltage of >1.2 V (volts) and up to about 6 V, for example from about 1.2 to about 6.0 V, from about 1.3 to about 6.0 V, from about 1.4 to about 6.0 V or from about 1.5 to about 6.0 V.

DETAILED DISCLOSURE

A metal hydride battery comprises at least one negative electrode, at least one positive electrode, a casing having said electrodes positioned therein and an electrolyte composition in contact with the electrodes.

The electrolyte composition is useful in an electrochemical cell such as a metal hydride battery (metal hydride cell). The active material of the negative electrode (anode material) comprises an $AB_x$ type alloy capable of storing hydrogen where x is from about 0.5 to about 5. The alloys are for example ABx type metal hydride (MH) alloys where in general, A is a hydride forming element and B is a weak or non-hydride forming element. A is in general a larger metallic atom with 4 or less valence electrons and B is in general a smaller metallic atom with 5 or more valence electrons. The alloys are capable of reversibly absorbing (charging) and desorbing (discharging) hydrogen. For example, the MH alloys are capable of reversibly absorbing and desorbing hydrogen electrochemically at ambient conditions (25° C. and 1 atm).

ABx type alloys are for example of the categories (with simple examples), AB (HfNi, TiFe, TiNi, ZrNi), $AB_2$ ($ZrMn_2$, $TiFe_2$, $ZrV_2$, $TiMn_2$), $A_2B$ ($Hf_2Fe$, $Mg_2Ni$, $Ti_2Ni$), $AB_3$ ($NdCo_3$, $GdFe_3$, $CeNi_3$, $YFe_3$), $A_2B_7$ ($Pr_2Ni_7$, $Ce_2Co_7$, $Y_2Ni_7$, $Th_2Fe_7$), $AB_5$ ($LaNi_5$, $CeNi_5$) and $A_6B_{23}$ ($Y_6Fe_{23}$).

Metal hydride alloys include alloys containing Ti, V and Mn (Ti—V—Mn alloys) and alloys containing Ti, V and Fe. For instance alloys containing from about 31 to about 46 atomic percent Ti, from about 5 to about 33 atomic percent V and from about 36 to about 53 atomic percent Mn and/or Fe. Suitable alloys are taught for instance in U.S. Pat. No. 4,111,689.

Metal hydride alloys include alloys of formula ABx where A comprises from about 50 to below 100 atomic percent Ti and the remainder is Zr and/or Hf and B comprises from about 30 to below 100 atomic percent of Ni and the remainder is one or more elements selected from Cr, V, Nb, Ta, Mo, Fe, Co, Mn, Cu and rare earths and x is from about 1 to about 3. These alloys are taught for example in U.S. Pat. No. 4,160,014.

Metal hydride alloys include alloys of formula $(TiV_{2-x}Ni_x)_{1-y}M_y$ where x is from about 0.2 to about 1.0 and M is Al and/or Zr; alloys of formula $Ti_{2-x}Zr_xV_{4-y}Ni_y$ where x is from 0 to about 1.5 and y is from about 0.6 to about 3.5; and alloys of formula $Ti_{1-x}Cr_xV_{2-y}Ni_y$ where x is from 0 to about 0.75 and y is from about 0.2 to about 1.0. These alloys are disclosed for example in U.S. Pat. No. 4,551,400.

Metal hydride alloys for example comprise one or more elements selected from the group consisting of Mg, Ti, V, Zr, Nb, La, Si, Ca, Sc and Y and one or more elements selected from the group consisting of Cu, Mn, Fe, Ni, Al, Mo, W, Ti, Re and Co. For instance, MH alloys may comprise one or more elements selected from Ti, Mg and V and comprise Ni. Advantageously, MH alloys comprise Ti and Ni, for instance in an atomic range of from about 1:4 to about 4:1. Advantageously, MH alloys comprise Mg and Ni, for instance in an atomic range of from about 1:2 to about 2:1. Suitable alloys are disclosed for example in U.S. Pat. No. 4,623,597.

MH alloys include those of formula $(Ti_{2-x}Zr_xV_{4-y}Ni_y)_{1-z}Cr_z$ where x is from 0 to about 1.5, y is from about 0.6 to about 3.5 and z is ≤0.2. These alloys are taught for instance in U.S. Pat. No. 4,728,586.

Metal hydride alloys for instance comprise V, Ti, Zr and Ni (Ti—V—Zr—Ni alloys) or V, Ti, Zr, Ni and Cr. For instance, MH alloys comprise Ti, V and Ni and one or more elements selected from Cr, Zr and Al. For example, MH alloys include $V_{22}Ti_{16}Zr_{16}Ni_{39}Cr_7$, $(V_{22}Ti_{16}Zr_{16}N_{39}Cr_7)_{95}Al_5$, $(V_{22}Ti_{16}Zr_{16}N_{39}Cr_7)_{95}Mn_5$, $(V_{22}Ti_{16}Zr_{16}N_{39}Cr_7)_{95}Mo_5$, $(V_{22}Ti_{16}Zr_{16}N_{39}Cr_7)_{95}Cu_5$, $(V_{22}Ti_{16}Zr_{16}N_{39}Cr_7)_{95}W_5$, $(V_{22}Ti_{16}Zr_{16}N_{39}Cr_7)_{95}Fe_5$, $(V_{22}Ti_{16}Zr_{16}N_{39}Cr_7)_{95}Co_5$, $V_{22}Ti_{16}Zr_{16}N_{32}Cr_7Co_7$, $V_{20.6}Ti_{15}Zr_{15}N_{30}Cr_{6.6}Co_{6.6}Mn_{3.6}Al_{2.7}$ and $V_{22}Ti_{16}Zr_{16}N_{27.8}Cr_7Co_{5.9}Mn_{3.1}Al_{2.2}$ alloys. For instance, MH alloys include alloys of formula $(V_{y'-y}Ni_yTi_{x'-x}Zr_xCr_z)_aM_b$ where y' is from about 3.6 to about 4.4, y is from about 0.6 to about 3.5, x' is from about 1.8 to about 2.2, x is from 0 to about 1.5, z is from 0 to about 1.44, a is from about 70 to about 100, b is from 0 to about 30 and M is one or more elements selected from the group consisting of Al, Mn, Mo, Cu, W, Fe and Co. Values are atomic percent (at %). Suitable MH alloys are taught for instance in U.S. Pat. No. 5,096,667.

MH alloys include those of formula (metal alloy)$_a$Co$_b$-Mn$_c$Fe$_d$Sn$_e$ where (metal alloy) comprises from about 0.1 to about 60 at % Ti, from about 0.1 to about 40 at % Zr, from 0 to about 60 at % V, from about 0.1 to about 57 at % Ni and from 0 to about 56 at % Cr; b is 0 to about 7.5 at %, c is from about 13 to about 17 at %, d is from 0 to about 3.5 at % and e is from 0 to about 1.5 at %, where a+b+c+d+e=100 at %. Suitable MH alloys are taught for example in U.S. Pat. No. 5,536,591.

Metal hydride alloys include LaNi$_5$ type alloys, alloys containing Ti and Ni and alloys containing Mg and Ni. Ti and Ni containing alloys may further contain one or more of Zr, V, Cr, Co, Mn, Al, Fe, Mo, La or Mm (mischmetal). Mg and Ni containing alloys may further contain one or more elements selected from Co, Mn, Al, Fe, Cu, Mo, W, Cr, V, Ti, Zr, Sn, Th, Si, Zn, Li, Cd, Na, Pb, La, Mm, Pd, Pt and Ca. Suitable alloys are taught for instance in U.S. Pat. No. 5,554,456.

Metal hydride alloys include LaNi$_5$ or TiNi based alloys. For example, MH alloys include one or more hydride forming elements selected from the group consisting of Ti, V and Zr and one or more elements selected from the group consisting of Ni, Cr, Co, Mn, Mo, Nb, Fe, Al, Mg, Cu, Sn, Ag, Zn and Pd. For example, MH alloys comprise one or more hydride forming elements selected from the group consisting of Sc, Y, La, Ce, Pr, Nd, Sm and Mm and one or more elements selected from the group consisting of Ni, Cr, Co, Mn, Fe, Cu, Sn, Al, Si, B, Mo, V, Nb, Ta, Zn, Zr, Ti, Hf and W. MH alloys may include one or more elements selected from the group consisting of Al, B, C, Si, P, S, Bi, In and Sb.

MH alloys include $(Mg_xNi_{1-x})_aM_b$ alloys where M is one or more elements selected from the group consisting of Ni, Co, Mn, Al, Fe, Cu, Mo, W, Cr, V, Ti, Zr, Sn, Th, Si, Zn, Li, Cd, Na, Pb, La, Mm, Pd, Pt and Ca; b is from 0 to about 30 atomic percent, a+b=100 atomic percent and x is from about 0.25 to about 0.75.

The MH alloys also include alloys of formula ZrMo$_d$Ni$_e$ where d is from about 0.1 to about 1.2 and e is from about 1.1 to about 2.5

MH alloys include alloys of formula ZrMn$_w$V$_x$M$_y$Ni$_z$ where M is Fe or Co and w is from about 0.4 to about 0.8 at %, x is from about 0.1 to about 0.3 at %, y is from 0 to about 0.2 at %, z is from about 1 to about 1.5 at % and w+x+y+z is from about 2 to about 2.4 at %.

MH alloys include alloys of formula LaNi$_5$ where La or Ni is substituted by one or more metals selected from periodic groups Ia, II, III, IV and Va other than lanthanides, in an atomic percent from about 0.1 to about 25.

MH alloys include those of formula TiV$_{2-x}$Ni$_x$ where x is from about 0.2 to about 0.6.

MH alloys also include alloys of formula Ti$_a$Zr$_b$Ni$_c$Cr$_d$M$_x$ where M is one or more elements selected from the group consisting of Al, Si, V, Mn, Fe, Co, Cu, Nb, Ag and Pd, a is from about 0.1 to about 1.4, b is from about 0.1 to about 1.3, c is from about 0.25 to about 1.95, d is from about 0.1 to about 1.4, x is from 0 to about 0.2 and a+b+c+d=about 3.

MH alloys include alloys of formula Ti$_{1-x}$Zr$_x$Mn$_{2-y-z}$Cr$_y$V$_z$ where x is from about 0.05 to about 0.4, y is from 0 to about 1.0 and z is from 0 to about 0.4.

MH alloys also include those of formula LnM$_5$ where Ln is one or more lanthanides and M is Ni and/or Co.

MH alloys for example comprise from about 40 to about 75 weight percent of one or more elements selected from periodic groups II, IV and V and one or more metals selected from the group consisting of Ni, Cu, Ag, Fe and Cr—Ni steel.

MH alloys may also comprise a main texture Mm-Ni system as taught for instance in U.S. Pat. No. 5,840,440.

Metal hydride alloys for instance comprise V, Ti, Zr, Ni, Cr and Mn. For instance, MH alloys comprise V, Ti, Zr, Ni, Cr, Mn and Al; V, Ti, Zr, Ni, Cr, Mn and Sn; V, Ti, Zr, Ni, Cr, Mn and Co; V, Ti, Zr, Ni, Cr, Mn, Al, Sn and Co; or comprise V, Ti, Zr, Ni, Cr, Mn, Al, Sn, Co and Fe. MH alloys include alloys of formula (metal alloy)$_a$Co$_b$Fe$_c$Al$_d$Sn$_e$ where (metal alloy) comprises from about 0.1 to about 60 at % Ti, from about 0.1 to about 40 at % Zr, from 0 to about 60 at % V, from about 0.1 to about 57 at % Ni, from about 5 to about 22 at % Mn and from 0 to 56 at % Cr, b is from about 0.1 to about 10 at %, c is from 0 to about 3.5 at %, d is from about 0.1 to 10 at %, e is from about 0.1 to about 3 at % and a+b+c+d+e=100 at %. Suitable MH alloys are taught for example in U.S. Pat. No. 6,270,719.

Metal hydride alloys include one or more alloys selected from the group consisting of AB, AB$_2$, AB$_5$ and A$_2$B type alloys where A and B may be transition metals, rare earths or combinations thereof where component A generally has a stronger tendency to form hydrides than component B. In AB hydrogen storage alloys, A for instance comprises one or more elements selected from the group consisting of Ti, Zr and V and B comprises one or more elements selected from the group consisting of Ni, V, Cr, Co, Mn, Mo, Nb, Al, Mg, Ag, Zn and Pd. AB alloys include ZrNi, ZrCo, TiNi, TiCo and modified forms thereof. A$_2$B type alloys include Mg$_2$Ni and modified forms thereof according to Ovshinsky principles where either or both of Mg and Ni are wholly or partially replaced by a multi-orbital modifier. AB$_2$ type alloys are Laves phase compounds and include alloys where A comprises one or more elements selected from the group consisting of Zr and Ti and B comprises one or more elements selected from the group consisting of Ni, V, Cr, Mn, Co, Mo, Ta and Nb. AB$_2$ type alloys include alloys modified according to the Ovshinsky principles. AB$_5$ metal hydride alloys include those where A comprises one or more elements selected from the group consisting of lanthanides and B comprises one or more transition metals. Included are LaNi$_5$ and LaNi$_5$ where Ni is partially replaced by one or more elements selected from the group consisting of Mn, Co, Al, Cr, Ag, Pd, Rh, Sb, V and Pt and/or where La is partially replaced by one or more elements selected from the group consisting of Ce, Pr, Nd, other rare earths and Mm. Included also are AB$_5$ type alloys modified according to the Ovshinsky principles. Such alloys are taught for instance in U.S. Pat. No. 6,830,725.

MH alloys include TiMn$_2$ type alloys. For instance metal hydride alloys comprise Zr, Ti, V, Cr, and Mn where Zr is from about 2 to about 5 at %, Ti is from about 26 to about 33 at %, V is from about 7 to about 13 at %, Cr is from about 8 to about 20 at % and Mn is from about 36 to about 42 at %. These alloys may further include one or more elements selected from the group consisting of Ni, Fe and Al, for instance from about 1 to about 6 at % Ni, from about 2 to about 6 at % Fe and from about 0.1 to about 2 at % Al. These alloys may also contain up to about 1 at % Mm. Suitable alloys include Zr$_{3.63}$Ti$_{29.8}$V$_{8.82}$Cr$_{9.85}$Mn$_{39.5}$Ni$_{2.0}$Fe$_{5.0}$Al$_{1.0}$Mm$_{0.4}$; Zr$_{3.6}$Ti$_{29.0}$V$_{8.9}$Cr$_{10.1}$Mn$_{40.1}$Ni$_{2.0}$Fe$_{5.1}$Al$_{1.2}$; Zr$_{3.6}$Ti$_{28.3}$V$_{8.8}$Cr$_{10.0}$Mn$_{40.7}$Ni$_{1.9}$Fe$_{5.1}$Al$_{1.6}$ and $Zr_1Ti_{33}V_{12.54}Cr_{15}Mn_{36}Fe_{2.25}Al_{0.21}$. Suitable alloys are taught for example in U.S. Pat. No. 6,536,487.

Metal hydride alloys may comprise 40 at % or more of $A_5B_{19}$ type structures of formula $La_aR_{1-a-b}Mg_bNi_{c-d-e}$ where $0 \leq a \leq 0.5$ at %, $0.1 \leq b \leq 0.2$ at %, $3.7 \leq c \leq 3.9$ at %, $0.1 \leq d \leq 0.3$ and $0 \leq d \leq 0.2$. Suitable alloys are taught for instance in U.S. Pat. No. 7,829,220.

The MH alloys of this invention may be in the form of hydrogen-absorbing alloy particles containing at least Ni and a rare earth. The particles may have a surface layer and an interior where the surface layer has a nickel content greater than that of the interior and nickel particles having a size of from about 10 nm to about 50 nm are present in the surface layer. Metal hydride alloys may be of formula $Ln_{1-x}Mg_xNi_{a-b-c}Al_bZ_c$, where Ln is one or more rare earth elements, Z is one or more of Zr, V, Bn, Ta, Cr, Mo, Mn, Fe, Co, Ga, Zn, Sn, In, Cu, Si, P and B, $0.05 \leq x \leq 0.3$ at %, $2.8 \leq a \leq 3.9$ at %, $0.05 \leq b \leq 0.25$ at % and $0.01 \leq c \leq 0.25$. Suitable alloys are taught for example in U.S. Pat. No. 8,053,114.

The MH alloys of this invention may comprise a crystalline structure having multiple phases containing at least an $A_2B_7$ type structure and an $A_5B_{19}$ type structure and a surface layer having a nickel content greater than that of the bulk. Metal hydride alloys include alloys of formula $Ln_{1-x}Mg_xNi_{y-a-b}Al_aM_b$, where Ln is one or more rare earths including Y, M is one or more of Co, Mn and Zn, where $0.1 \leq x \leq 0.2$ at %, $3.5 \leq y \leq 3.9$ at %, $0.1 \leq a \leq 0.3$ at % and $0 \leq b \leq 0.2$. Suitable alloys are disclosed for example in U.S. Pat. No. 8,124,281.

Metal hydride alloys may be of formula $Ln_{1-x}Mg_x(Ni_{1-y}T_y)_z$ where Ln is one or more elements selected from lanthanide elements, Ca, Sr, Sc, Y, Ti, Zr and Hf, T is one or more elements selected from V, Nb, Ta, Cr, Mo, Mn, Fe, Co, Al, Ga, Zn, Sn, In, Cu, Si, P and B and where $0 < x \leq 1$ at %, $0 \leq y \leq 0.5$ at %, and $2.5 \leq z \leq 4.5$ at %. Suitable alloys are taught for instance in U.S. Pat. No. 8,257,862.

The MH alloys of this invention may comprise La, Nd, Mg, Ni and Al; La, Nd, Mg, Ni, Al and Co; La, Pr, Nd, Mg, Ni and Al or La, Ce, Pr, Nd, Ni, Al, Co and Mn as taught in U.S. Pat. No. 8,409,753.

Metal hydride alloys may be of formula $Ti_AZr_{B-X}Y_XV_C$-$Ni_DM_E$ where A, B, C and D are each greater than 0 and less than or equal to 50 at %, X is greater than 0 and less than or equal to 4 at %, M is one or more metals selected from Co, Cr, Sn, Al and Mn and E is from 0 to 30 at %. Suitable alloys are taught for example in U.S. Pub. No. 2013/0277607.

The MH alloys of this invention include $A_2B_7$ type hydrogen storage alloys. For instance, the MH alloys may be $A_xB_y$ alloys where A includes at least one rare earth element and also includes Mg; B includes at least Ni and the atomic ratio x to y is from about 1:2 to about 1:5, for instance about 1:3 to about 1:4. MH alloys may further comprise one or more elements selected from the group consisting of B, Co, Cu, Fe, Cr and Mn. The atomic ratio of Ni to the further elements may be from about 50:1 to about 200:1. The rare earths include La, Ce, Nd, Pr and Mm. The atomic ratio of rare earths to Mg may be from about 5:1 to about 6:1. The B elements may further include Al where the atomic ratio of Ni to Al may be from about 30:1 to about 40:1.

Metal hydride alloys include ABx high capacity hydrogen storage alloys where x is from about 0.5 to about 5 and which has a discharge capacity of $\geq 400$ mAh/g, $\geq 425$ mAh/g, $\geq 450$ mAh/g or $\geq 475$ mAh/g.

Metal hydride alloys include high capacity MH alloys containing magnesium (Mg), for example an AB, $AB_2$ or $A_2B$ type alloy containing Mg and Ni. For instance, MH alloys include MgNi, $MgNi_2$ and $Mg_2Ni$. Such Mg and Ni containing alloys may further comprise one or more elements selected from the group consisting of rare earth elements and transition metals. For instance, alloys containing Mg and Ni may further comprise one or more elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca.

For instance, MH alloys comprise Mg and Ni and optionally one or more elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca.

Mm is "mischmetal". Mischmetal is a mixture of rare earth elements. For instance, Mm is a mixture containing La, Nd and Pr, for instance containing Ce, La, Nd and Pr.

For example, MH alloys include MgNi, $Mg_{0.8}Ti_{0.2}Ni$, $Mg_{0.7}Ti_{0.3}Ni$, $Mg_{0.9}Ti_{0.1}Ni$, $Mg_{0.8}Zr_{0.2}Ni$, $Mg_{0.7}Ti_{0.225}La_{0.075}Ni$, $Mg_{0.8}Al_{0.2}Ni$, $Mg_{0.9}Ti_{0.1}Ni$, $Mg_{0.9}Ti_{0.1}NiAl_{0.05}$, $Mg_{0.08}Pd_{0.2}Ni$, $Pd_{0.2}Ni$, $Mg_{0.09}Ti_{0.1}NiAl_{0.05}$, $Mg_{0.09}Ti_{0.1}NiAl_{0.05}Pd_{0.1}$, $Mg_{50}Ni_{45}Pd_5$, $Mg_{0.85}Ti_{0.15}Ni_{1.0}$, $Mg_{0.95}Ti_{0.15}Ni_{0.9}$, $Mg_2Ni$, $Mg_{2.0}Ni_{0.6}Co_{0.4}$, $Mg_2Ni_{0.6}Mn_{0.4}$, $Mg_2Ni_{0.7}Cu_{0.3}$, $Mg_{0.8}La_{0.2}Ni$, $Mg_{2.0}Co_{0.1}Ni$, $Mg_{21}Cr_{0.1}Ni$, $Mg_{2.0}Nb_{0.1}Ni$, $Mg_{2.0}Ti_{0.1}Ni$, $Mg_2.0V_{0.1}Ni$, $Mg_{1.3}Al_{0.7}Ni$, $Mg_{1.5}Ti_{0.5}Ni$, $Mg_{1.5}Ti_{0.5}Zr_{0.1}Al_{0.1}Ni$, $Mg_{1.75}Al_{0.25}Ni$ and $(MgAl)_2Ni$, $Mg_{1.70}Al_{0.3}Ni$.

For example, MH alloys include alloys of Mg and Ni in an atomic ratio of from about 1:2 to about 2:1 further comprising one or more elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca. The further element or elements may be present from about 0.1 to about 30 atomic percent (at %) or from about 0.25 to about 15 at % or from about 0.5, about 1, about 2, about 3, about 4 or about 5 at % to about 15 at %, based on the total alloy. The atomic ratio of Mg to Ni is for instance about 1:1. Thus, Mg and Ni together may be present from about 70 at % to about 99.9 at % based on the total alloy. Mg—Ni MH alloys may be free of further elements where Mg and Ni together are present at 100 at %.

Metal hydride alloys may comprise Mg and Ni in an atomic ratio of from about 1:2 to about 2:1 where Mg and Ni together are present at a level of 70 at %, based on the total alloy.

Metal hydride alloys may comprise $\geq 20$ at % Mg.

Metal hydride alloys may comprise Mg and Ni in an atomic ratio of from about 1:2 to about 2:1 and further comprise Co and/or Mn. The alloys of this invention include $Mg_{52}Ni_{39}Co_6Mn_3$ and $Mg_{52}Ni_{39}Co_3Mn_6$.

Metal hydride alloys may contain 90 weight % Mg and one or more additional elements. The one or more additional elements may be selected from the group consisting of Ni, Mm, Al, Y and Si. These alloys may contain for example from about 0.5 to about 2.5 weight Ni and about 1.0 to about 4.0 weight % Mm. These alloys may also contain from about 3 to about 7 weight % Al and/or from about 0.1 to about 1.5 weight % Y and/or from about 0.3 to about 1.5 weight % Si.

Suitable high capacity MH alloys are disclosed for example in U.S. Pat. Nos. 5,506,069, 5,616,432 and 6,193,929.

The MH alloys of this invention for instance may be capable of storing at least 6 weight % hydrogen and/or absorbing at least 80% of the full storage capacity of hydrogen in under 5 minutes at 300° C.; or may be capable of storing at least 6.5 weight % of hydrogen and/or absorbing 80% of the full storage capacity of hydrogen in under 2 minutes at 300° C.; or may be capable of storing at least 6.9 weight % of hydrogen and/or capable of absorbing 80% of the full storage capacity of hydrogen in under 1.5 minutes at 300° C.

Metal hydride alloys include alloys of formula $Ti_aZr_{b-x}Y_xV_cNi_dM_e$ where each of a, b, c and d are greater than 0 and less than or equal to 50 at %, x is greater than 0 and less than or equal to 4 at %, M is one or more metals selected from the group consisting of Co, Cr, Sn, Al and Mn and e is from 0 to about 30 at %. These alloys are disclosed for example in U.S. Pub. No. 2013/0277607.

The active materials of the positive electrode (cathode materials) participate in the charge/discharge reactions. The active materials are for instance nickel hydroxide active materials, i.e. nickel hydroxide or modified nickel hydroxide.

The cathode materials may comprise a multi-phase disordered nickel hydroxide material having at least one modifier. The at least one modifier is for instance a metal, a metallic oxide, a metallic oxide alloy, a metal hydride and/or a metal hydride alloy. For example, the modifier is one or more components selected from the group consisting of Al, Ba, Ca, F, K, Li, Mg, Na, Sr, Bi, Co, Cr, Cu, Fe, In, $LaH_3$, Mn, Ru, Sb, Sn, $TiH_2$, TiO, and Zn. Such materials are taught in U.S. Pat. No. 5,348,822.

Suitable cathode materials may comprise a disordered multi-phase nickel hydroxide matrix including at least one modifier, for example 3 modifiers, chosen from F, Li, Na, K, Mg, Ba, Ln, Se, Nd, Pr, Y, Co, Zn, Al, Cr, Mn, Fe, Cu, Zn, Sc, Sn, Sb, Te, Bi, Ru and Pb. Suitable cathode materials are taught for example in U.S. Pat. No. 5,637,423.

Cathode materials may comprise nickel hydroxide modified with one or more group II elements and Co in a solid solution state. Such materials are taught in U.S. Pat. No. 5,366,831.

The cathode active materials may comprise nickel hydroxide and one or more components selected from the group consisting of cobalt, cobalt hydroxide and cobalt oxide and a carbon powder. The cathode materials may further comprise a compound of Ca, Sr, Ba, Cu, Ag or Y, for example $Ca(OH)_2$, CaO, $CaF_2$, CaS, $CaSO_4$, $CaSi_2O_5$, $CaC_2O_4$, $CaWO_4$, $SrCo_3$, $Sr(OH)_2$, BaO, $Cu_2O$, $Ag_2O$, $Y_2(Co_3)_3$ or $Y_2O_3$. Suitable cathode materials are taught for instance in U.S. Pat. No. 5,451,475.

Cathode active materials may comprise a metal oxide and one or more of Co, Ca, Ag, Mn, Zn, V, Sb, Cd, Y, Sr, Ba and oxides of Ca, Sr, Ba, Sb, Y or Zn. The metal oxide is for example nickel oxide and or manganese oxide. Such active materials are taught in U.S. Pat. No. 5,455,125.

The cathode materials may contain nickel hydroxide and a further component selected from the group consisting of Y, In, Sb, Ba and Be and Co and/or Ca. Such materials are disclosed in U.S. Pat. No. 5,466,543.

Cathode materials may be prepared by reacting nickel sulfate and ammonium hydroxide to form a nickel ammonium complex; the complex is then reacted with sodium hydroxide to form nickel hydroxide. The method may provide nickel hydroxide comprising one or more of Co, Zn and Cd. These materials are taught in U.S. Pat. No. 5,498,403.

Cathode active materials may comprise nickel hydroxide and cobalt oxyhydroxide as taught in U.S. Pat. No. 5,489,314.

Cathode materials may comprise nickel hydroxide, cobalt monoxide and elemental zinc as taught in U.S. Pat. No. 5,506,070.

The cathode materials may comprise nickel hydroxide, nickel powder, a second powder and at least one of cobalt, cobalt hydroxide and cobalt oxide. The second powder contains one or more of Ca, Sr, Ba, Cu, Ag and Y. Such materials are taught in U.S. Pat. No. 5,571,636.

The cathode active materials may comprise particles of nickel hydroxide or manganese hydroxide having at least partially embedded therein a conductive material. The conductive material may be for instance nickel, nickel alloys, copper, copper alloys; metal oxides, nitrides, carbides, silicides or borides; or carbon (graphite). These materials are disclosed in U.S. Pat. No. 6,177,213.

The cathode materials may comprise nickel hydroxide particles containing at least three modifiers selected from the group consisting of Al, Bi, Ca, Co, Cr, Cu, Fe, In, La, rare earths, Mg, Mn, Ru, Sb, Sn, Ti, Ba, Si, Sr and Zn. For example, nickel hydroxide particles may contain at least four modifiers, for instance, Ca, Co, Mg and Zn. Such materials are disclosed in U.S. Pat. No. 6,228,535.

The active cathode material for instance comprises nickel hydroxide and a carbon material such as graphite. The active material may also comprise a polymeric binder. The polymeric binder is for example a thermoplastic organic polymer, for instance selected from the group consisting of polyvinyl alcohol (PVA), polyethylene oxide, polypropylene oxide, polybutylene oxide, methyl cellulose, carboxymethyl cellulose, hydroxyethyl cellulose, hydroxypropyl cellulose, hydroxypropylmethyl cellulose, polyethylene, polypropylene, polyisobutylene, polyvinyl chloride, polyvinyliden chloride, polyvinyliden fluoride, polytetrafluoroethylene (PTFE), fluorinated ethylene propylene (FEP), perfluroalkoxy (PFA), polyvinylacetate, polyvinyl isobutylether, polyacrylonitrile, polymethacrylonitrile, polymethylmethacrylate, polymethylacrylate, polyethylmethacrylate, allyl acetate, polystyrene, polybutadiene, polyisoprene, polyoxymethylene, polyoxyethylene, polycyclic thioether, polydimethylsiloxane, polyesters such as polyethylene terephthalate, polycarbonate and polyamide. Blends and copolymers of the above are also suitable. The polymeric binder may also be an elastomer or rubber such as styrene-butadiene copolymer, styrene-butadiene-styrene block copolymer, styrene-isoprene block copolymer, styrene-isoprene-styrene block copolymer, styrene-ethylene-styrene-butadiene block copolymer, styrene-ethylene-butadiene-styrene block copolymer or styrene-acrylonitrile-butadiene-methyl acrylate copolymer. Suitable active materials are taught for instance in U.S. Pat. No. 6,617,072.

The cathode active material may contain nickel hydroxide and nickel oxyhydroxide as taught in U.S. Pat. No. 7,396,379.

Generally, cathode active material particles are formed in a sintered or pasted electrode. The pasted electrode may be made by mixing the material with various additives and/or binders and applying the paste to a conductive support. Preferably, one or more cobalt additives are added to the pasted electrode. The cobalt additives may include Co and/or CoO to enhance conductivity, improve utilization and reduce electrical resistance of the positive electrode.

In general, cathode active materials are nickel hydroxide or modified nickel hydroxide. Modified nickel hydroxide may contain one or more modifiers such as Co, Cd, Ag, V, Sb, Ca, Mg, Al, Bi, Cr, Cu, Fe, In, rare earths, Mn, Ru, Sn, Ti, Ba, Si, Sr or Zn. A suitable modified nickel hydroxide is $(Ni,Co,Zn)(OH)_2$, for instance in the form of a spherical powder. In modified nickel hydroxides, nickel generally is present at a level of ≥80 atomic percent, for instance ≥90 atomic percent, based on the metals.

For example, the MH battery comprises at least one negative electrode which comprises an $AB_x$ type alloy capable of reversibly storing hydrogen and comprises as least one positive electrode comprising nickel hydroxide or modified nickel hydroxide active materials.

A separator may be present which separates the negative electrodes from the positive electrodes. The separator is for instance a nonwoven web of natural or synthetic fibers. Natural fibers include cotton. Synthetic fibers include polyamide, polyester, polypropylene (PP), polyethylene (PE), PP/PE copolymer, polytetrafluoroethlene (PTFE), polyvinylchloride and glass.

Ionic liquids are ionic compounds that exhibit a melting point of ≤100° C.

Cations of ionic liquids include ammonium and phosphonium ions.

For instance, ionic liquids may contain a cation selected from the group consisting of formulae (a)-(h)

 (a)

 (b)

 (c)

 (d)

 (e)

 (f)

 (g)

 (h)

where
each R is independently H, $C_1$-$C_{16}$alkyl or hydroxy$C_1$-$C_{16}$alkyl, for instance methyl, ethyl, hydroxyethyl or propyl and
X is $CH_2$, O, S or NR where R is H or $C_1$-$C_{16}$alkyl, for instance H, methyl, ethyl or propyl.

Examples of ammonium ions include protic ions such as $NH_4^+$ (ammonium), methylammonium, ethylammonium, dimethylammonium, diethylammonium, trimethylammonium ($NMe_3H^+$), triethylammonium, tributylammonium, diethylmethylammonium, hydroxyethylammonium, methoxymethylammonium, dibutylammonium, methylbutylammonium, anilinium, pyridinium, 2-methylpyridinium, imidazolium, 1-methylimidazolium, 1,2-dimethylimidazolium, imidazolinium, 1-ethylimidazolium, 1-(4-sulfobutyl)-3-methylimidazolium, 1-allylimidazolium, quinolinium, isoquinolinium, pyrrolinium, pyrrolininium and pyrrolidinium.

Examples of ammonium ions also include aprotic ions such as 1-butyl-1-methylpyrrolidinium, tetramethylammonium, tetraethylammonium, tetra-n-butylammonium, n-butyl-tri-ethylammonium, benzyl-tri-methylammonium, tri-n-butylmethylammonium, benzyl-tri-ethylammonium, 1-methylpyridinium, 1-butyl-3,5-dimethylpyridinium, 1,2,4-trimethylpyrazolium, trimethylhydroxyethylammonium (choline), tri-(hydroxyethyl)methylammonium, dimethyl-di(polyoxyethylene)ammonium, 1,2,3-trimethylimidazolium, 1-butyl-3-methylimidazolium, 1-ethyl-2,3-dimethylimidazolium, 1-allyl-3-methylimidazolium, 1-hydroxyethyl-3-methylimidazolium, 1,3-dimethylimidazolium, 1-ethyl-1-methylpiperidinium, 4-ethyl-4-methylmorpholinium, 1-(cyanomethyl)-3-methylimidazolium, 1-(3-cyanopropyl)pyridinium, 1,3-bis(cyanomethyl)imidazolium, 1-hexyl-3-methylimidazolium and 1-ethyl-3-methylimidazolium.

Pyrrolinium is the ammonium of pyrrole, pyrrolininium is the ammonium of pyrroline and pyrrolidinium is the ammonium of pyrrolidine. Pyrroline may be 1-, 2- or 3-pyrroline, thus the ammonium cation of 1-, 2- or 3-pyrroline is included.

Examples of phosphonium ions include methyltriphenylphosphonium, tetraphenylphosphonium, tetrabutylphosphonium, tributylmethylphosphonium, triethylmethylphosphonium, trihexyltetradecylphosphonium, triphenylpropylphosphonium and tetrakis(hydroxymethyl)phosphonium.

For instance, suitable cations of ionic liquids include 1-ethyl-3-methylimidazolium, 1-hexyl-3-methylimidazolium, 1-butyl-1-methylpyrrolidinium and trihexyl(tetradecyl)phosphonium.

Anions of ionic liquids include carboxylates, imides, methides, nitrate, bifluoride, halides, borates, phosphates, phosphinates, phosphonates, sulfonates, sulfates, carbonates and aluminates.

The ionic liquids may contain an anion selected from the group consisting of

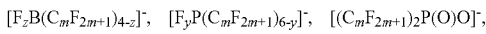

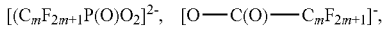

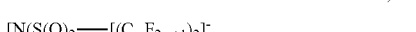

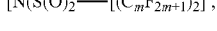

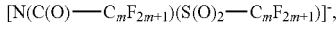

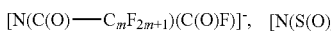

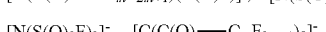

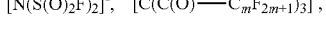

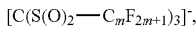

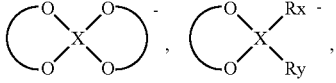

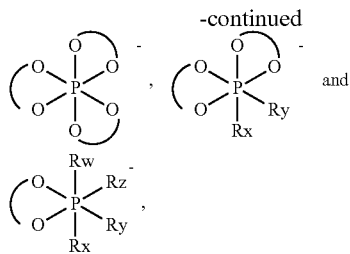

where
y is an integer of 1 to 6,
m is an integer of 1 to 8, for instance 1 to 4,
z is an integer of 1 to 4,
x is B or Al and
$R_w$, $R_x$, $R_y$ and $R_z$ are independently halogen, $C_1$-$C_{20}$alkyl, $C_1$-$C_{20}$alkyl which is partly or fully fluorinated, $C_1$-$C_{20}$alkoxy, $C_1$-$C_{20}$alkoxy which is partly or fully fluorinated, $C_1$-$C_{20}$alkyl-COO or $C_1$-$C_{20}$alkyl-COO which is partly or fully fluorinated and
O⌢O is independently a bidentate group derived from the —OH groups of a 1,2- or 1,3-diol, a 1,2- or 1,3-dicarboxylic acid or from a 1,2- or 1,3-hydroxycarboxylic acid and where any one $CF_2$ group may be replaced by O, $S(O)_2$, NR or $CH_2$.

The anions of ionic liquids may include $F_2P(C_2F_5)_4^-$, $F_3P(C_2F_5)_3^-$, $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$, $F_4P(C_4F_9)_2^-$, perfluoroalkylcarboxylate, perfluoroalkylsulfonate, bis(perfluoroalkylsulfonyl)imide, (perfluoroalkylsulfonyl)(perfluoroalkylcarboxyl)imide, tris(perfluoroalkylsulfonyl)methide, trifluoroacetate, trifluoromethanesulfonate (triflate), bis(trifluoromethylsulfonyl)imide, tris(trifluoromethylsulfonyl)methide, tetrafluoroborate, spiro-oxo borates and spiro-oxo phosphates, for example bisoxalatoborate (BOB), difluorooxalatoborate (dFOB), di(trifluoroacetato)oxalatoborate (d(Ac)OB), trisoxalatophosphate, tetrafluorooxalatophosphate and di(trifluoroacetato)oxalatoaluminate.

Carboxylate anions include those of formula RCOO⁻ where R is hydrogen or hydrocarbyl and include formate, acetate (ethanoate), propanoate, n-butanoate, i-butanoate, n-pentanoate, i-pentanoate, octanoate, decanoate, benzoate, salicylate, thiosalicylate, 2-, 3- or 4-nitrobenzoate; citrate, oxalate, tartrate, glycolate, gluconate, malate, mandelate, a carboxylate of nitrilotriacetic acid, a carboxylate of N-(2-hydroxyethyl)-ethylenediaminetriacetic acid, a carboxylate of ethylenediaminetetraacetic acid, a carboxylate of diethylenetriaminepentaacetic acid and haloalkylcarboxylates such as fluoroacetate, difluoroacetate, trifluoroacetate, chloroacetate, dichloroacetate and trichloroacetate.

Imide anions include dicyanamide, $N(SO_2F)_2^-$ ((bisfluorosulfonyl)imide), bis(perfluoroalkylsulfonyl)imides such as $[N(SO_2CF_3)_2]^-$ (bistriflimide), bis(pentafluoroethylsulfonyl)imide and $N(CF_3SO_2)(CF_3(CF_2)_3SO_2)^-$ and (perfluoroalkylsulfonyl)(perfluoroalkylcarboxyl)imides.

Methides include tris(perfluoroalkylsulfonyl)methides such as tris(trifluoromethylsulfonyl)methide, $C(CF_3SO_2)_3^-$.

Bifluoride is $HF_2^-$.

Halide is chloride, bromide, iodide or fluoride.

Borates include orthoborate, tetrahydroxyborate, tetraborate, tetraphenylborate, $[B(3,5-(CF_3)_2C_6H_3)_4]^-$ (BARF), $B(C_2O_4)_2^-$ (bis(oxalato)borate) (BOB), difluoro(oxalato)borate (dFOB), di(trifluoroacetato)oxalatoborate (D(Ac)OB), $B(C_6F_5)_4^-$ and $BF_4^-$ (tetrafluoroborate).

Phosphates include dihydrogen phosphate, hydrogen phosphate, alkyl phosphate, dialkyl phosphate, phosphate, $PF_6^-$ (hexafluorophosphate), $HPO_3F^-$ (fluorohydrogen phosphate), trisoxalatophosphate (TOP), tetrafluorooxalatophosphate (TFOP) and fluoro(perfluoroalkyl)phosphates such as $F_2P(C_2F_5)_4^-$, $F_3P(C_2F_5)_3^-$ (tris(pentafluoroethyl)trifluorophosphate or FAP), $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$ and $F_4P(C_4F_9)_2^-$.

Sulfonates include alkyl, arylsulfonates and perfluoroalkylsulfonates, for instance trifluoromethanesulfonate (triflate), p-toluenesulfonate (tosylate) or methanesulfonate (mesylate).

Sulfates include hydrogensulfate, sulfate, thiosulfate and alkylsulfates such as methylsulfate and ethylsulfate.

Carbonate anions are for instance carbonate, hydrogencarbonate or an alkylcarbonate such as methylcarbonate, ethylcarbonate or butylcarbonate.

Aluminates include $Al(OC(CF_3)_3)_4^-$, di(trifluoroacetato)oxalatoaluminate (d(Ac)OAl), tetrachloroaluminate, tetrafluoroaluminate, tetraiodoaluminate and tetrabromoaluminate.

Ionic liquids include protic compounds such as diethylmethylammonium trifluoromethanesulfonate (DEMA TfO), ethylammonium nitrate, triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium hydrogensulfate, 1-methylimidazolium chloride, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonum dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride or dimethylammonium bifluoride.

Ionic liquids include aprotic compounds such as 1-ethyl-3-methylimidazolium trifluoromethanesulfonate (EMIM TfO), 1-ethyl-3-methylimidazolium tetrafluoroborate (EMIM BF$_4$), 1-ethyl-3-methylimidazolium bis(trifluoromethylsulfonyl)imide (EMIM TFSI), 1-ethyl-3-methylimidazolium acetate (EMIM Ac), 1-butyl-3-methylimidazolium trifluoromethanesulfonate (BMIM TfO), 1-butyl-3-methylimidazolium acetate (BMIM Ac), 1-butyl-3-methylimidazolium bis(trifluoromethylsulfonyl)imide (BMIM TFSI), tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogencarbonate, 1-butyl-3-methylimidazolium hydrogensulfate, 1-butyl-3-methylimidazolium chloride, 1,2,3-trimethylimidazolium methylsulfate, tris-(hydroxyethyl)methylammonium methylsulfate, 1,2,4-trimethylpyrazolium methylsulfate, 1,3-dimethylimdiazolium hydrogencarbonate, 1-ethyl-3-methylimidazolium hydrogencarbonate, 1-ethyl-3-methylimidazolium chloride, 1-ethyl-3-methylimidazolium tetrachloroaluminate, 1-ethyl-3-methylimidazolium thiocyanate, 1-ethyl-3-methylimidazolium methanesulfonate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium hexafluorophosphate, 1-butyl-3,5-dimethylpyridinium bromide, 1-ethyl-3-methylimidazolium bis(pentafluoroethylsulfonyl)imide, 1-ethyl-2,3-dimethylimidazolium methylcarbonate, carboxymethyl-tributylphosphonium bis(trifluoromethylsulfonyl)imide, N-carboxyethyl-methylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis(trifluromethylsulfonyl)imide, tetrabutylphosphonium methanesulfonate, triethylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylphosphonium dibutylphosphate, triethylmethylphosphonium dibutylphosphate, tetrabutylphosphonium tetrafluoroborate, tetrabutylphosphonium p-toluenesulfonate, tributylmethylphosphonium methylcarbonate, 1-ethyl-3-methylimidazolium hydrogencarbonate, tributylmethylammonium methylcarbonate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl)pyridinium chloride, 1-(3-cyanopropyl)pyridinium bis(trifluoromethylsulfonyl)imide, 1,3-bis(cyanomethyl)imidazolium chloride, 1,3-bis(cyanomethyl)imidazolium bis(trifluoromethylsulfonyl)imide, 1,3-bis(cyanopropyl)imidazolium chloride, 1,3-bis(3-cyanopropyl)imidazolium bis(trifluoromethylsulfonyl)imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3-methylimidazolium chloride, tributylphosphonium methylsulfate, triethylmethylphosphonium dibutylphosphate, trihexyltetradecylphosphonium bis(trifluromethylsulfonyl)imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate or 3-(triphenylphosphonio)propane-1-sulfonic acid tosylate.

Hydrocarbyl is for instance alkyl, alkenyl, cycloalkyl, cycloalkenyl, aryl or aralkyl, each of which may be substituted by one or more groups selected from the group consisting of halogen, hydroxy, $C_1$-$C_4$alkoxy, thio, $C_1$-$C_4$alkylthio, amino, $C_1$-$C_4$alkylamino, di-$C_1$-$C_4$alkylamino, nitro, cyano, —COOH and —COO$^-$. Hydrocarbyl may also be interrupted by one or more groups selected from the group consisting of —O—, —S—, —NH— and —N($C_1$-$C_4$alkyl)-. Hydrocarbyl may be both substituted by one or more of said groups and interrupted by one or more of said groups. For instance alkyl, alkenyl, cycloalkyl, cycloalkenyl, aryl or aralkyl may be substituted by one to three groups selected from the group consisting of chloro, hydroxy, methoxy, ethoxy, propoxy, butoxy, thio, methylthio, methylamino, ethylamino, propylamino, butylamino, dimethylamino, diethylamino, dipropylamino, dibutylamino, —COOH, —COO$^-$, cyano and nitro and/or may be interrupted by one to three groups selected from the group consisting of —O—, —S—, —NH— and —N($C_1$-$C_4$alkyl)-.

Alkyl is for instance from 1 to 25 carbon atoms, is branched or unbranched and includes methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl and docosyl.

Partly or fully fluorinated means replacement of one, more than one or all of the hydrogens of the alkyl with fluoro. Perfluoroalkyl means all hydrogens of an alkyl are replaced with fluoro (fully fluorinated).

Alkenyl is an unsaturated version of alkyl, for instance allyl.

Cycloalkyl includes cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl or cyclooctyl.

Cycloalkenyl is an unsaturated version of cycloalkyl.

Aryl includes phenyl, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethyl phenyl, 4-tert-butyl phenyl, 2-ethyl phenyl or 2,6-diethyl phenyl.

Aralkyl includes benzyl, α-methylbenzyl, α,α-dimethylbenzyl and 2-phenylethyl.

Halogen is Cl, Br, I or F.

Suitable ionic liquids are also described for example in U.S. Pub. Nos. 2011/0045359 and 2014/0193707.

Protic acids, also called Brønsted acids, for instance have a pKa of less than or equal to about 5.

Protic acids include inorganic acids such as hydrochloric acid, nitric acid, phosphoric acid, sulfuric acid, boric acid, hydrofluoric acid, hydrobromic acid, hydroiodic acid, perchloric acid and periodic acid.

Protic acids also include bisulfates such as sodium bisulfate, potassium bisulfate and ammonium bisulfate Protic acids also include $HAsF_6$, $HBF_4$, $H(OEt_2)BF_4$, $HPF_6$, $H[N(SO_2CF_3)_2]$ or $H[N(SO_2CF_2CF_3)_2]$.

Protic acids include organic acids. Organic acids include carboxylic acids of formula RCOOH where R is hydrogen or hydrocarbyl.

Carboxylic acids include formic acid, acetic acid, acrylic acid, fluoroacetic acid, difluoroacetic acid, trifluoroacetic acid, chloroacetic acid, dichloroacetic acid, trichloroacetic acid, propanoic acid, butyric acid, 3-methylbutanoic acid, valeric acid, hexanoic acid, heptanoic acid, caprylic acid, nonanoic acid, benzoic acid, salicylic acid, 2-, 3- or 4-nitrobenzoic acid; citric acid, oxalic acid, tartaric acid, glycolic acid, gluconic acid, malic acid, mandelic acid, nitrilotriacetic acid, N-(2-hydroxyethyl)-ethylenediaminetriacetic acid, ethylenediaminetetraacetic acid and diethyleneaminepentaacetic acid.

Organic acids also include sulfonic acids of formula $RSO_3H$ where R is alkyl or aryl or alkyl or aryl substituted by one to three halogens, such as p-toluenesulfonic acid, phenylsulfonic acid, methanesulfonic acid and trifluoromethanesulfonic acid.

The protic acid may also be an oxonium ion of a highly non-coordinating ion such as Brookhart's acid (BARF acid), $[H(OEt_2)_2][B[3,5-(CF_3)_2C_6H_3]_4]$. Other examples include $[H(OEt_2)_2][B(C_6F_5)_4]$(oxonium acid) and $[H(OEt_2)_2][Al(OC(CF_3)_3)_4]$. In these cases the cation is protonated diethyl ether (diethyl ether oxonium). Alternatively, the cation may be other protonated ethers, for instance protonated tetrahydrofuran (THF).

Suitable organic solvents are for instance selected from the group consisting of organic carbonates, ethers, glymes, ortho esters, polyalkylene glycols, esters, lactones, glycols, formates, sulfones, sulfoxides, amides, alcohols, ketones, nitro solvents, nitrile solvents and combinations thereof.

Organic carbonates are cyclic or acyclic and include ethylene carbonate (EC), propylene carbonate (PC), trimethylene carbonate, 1,2-butylene carbonate (BC), dimethyl carbonate (DMC), diethyl carbonate (DEC), ethylmethyl carbonate (EMC), vinylene carbonate, difluoroethylene carbonate and monofluoroethylene carbonate.

Ethers and glymes include dimethoxymethane (DMM), diethoxymethane, 1,2-dimethoxyethane (DME or ethyleneglycol dimethylether or glyme), diglyme, triglyme, tetraglyme, ethyleneglycol diethylether (DEE), ethyleneglycol dibutylether, diethyleneglycol diethylether, tetrahydrofuran (THF), 2-methyltetrahydrofuran (2-MeTHF), 1,3-dioxane, 1,3-dioxolane (DIOX), 4-methyl-1,3-dioxolane (4-MeDIOX), 2-methyl-1,3-dioxolane (2-MeDIOX), 1,4-dioxane, dimethylether, ethylmethylether, diethylether, di-n-butylether, di-t-butylether, di-isopropylether, methyl-t-butylether, ethyl-t-butylether and t-amyl-methylether.

Ortho esters include trimethoxymethane, triethoxymethane, 1,4-dimethyl-3,5,8-trioxabicyclo[2.2.2]octane and 4-ethyl-1-methyl-3,5,8-trioxabicyclo[2.2.2]octane.

Polyalkylene glycols are homo- or cooligomers or homo- or copolymers of $C_1$-$C_4$alkylene glycols. For instance, polyethylene glycol (PEG) or monomethyl, dimethyl or diethyl (end-capped) polyethylene glycol. Weight average molecular weights (Mw) of polyalkylene glycols are for example from about 200 to about 1200 g/mol, from about 200 to about 1000 g/mol, from about 200 to about 900 g/mol, from about 200 to about 700 g/mol or from about 200 to about 500 g/mol. Included are oligomers of 4 monomers and more, for instance tetraethylene glycol, fluorinated tetraethylene glycol and tetrapropylene glycol. For instance PEG 200, PEG 300, PEG 400, PEG 500, PEG 600, PEG 700, PEG 800, PEG 900 or PEG 1000.

Esters and lactones include γ-butyrolactone (GBL), γ-valerolactone, δ-valerolactone, ethyl acetate (EA), 2-methoxyethyl acetate, 2-ethoxyethyl acetate, 2-butoxyethyl acetate, 2-(2-butoxyethoxy)ethyl acetate (diethylene glycol butyl ether acetate, DBA), ethylene glycol diacetate (EGDA), 3-ethoxy ethyl propionate (EEP), methyl butyrate (MB), n-amyl acetate (NAAC), propylene glycol methyl ether acetate (PMA), ethyl butryate (EB), diethyl malonate, dimethyl malonate and dibasic ester mixture (DBE).

Dibasic ester mixture includes for instance methyl esters of adipic, glutaric and succinic acids.

Glycols include ethylene glycol, propylene glycol, 2-methoxyethanol, 2-ethoxyethanol, 2-propoxyethanol, 2-isopropoxyethanol, 2-butoxyethanol (ethylene glycol butyl ether, EB), 2-phenoxyethanol, 2-benzyloxyethanol, 2-(2-methoxyethoxy)ethanol, 2-(2-ethoxyethoxy)ethanol, 2-(2-butoxyethoxy)ethanol (diethylene glycol butyl ether, DB), propylene glycol butyl ether (PB), propylene glycol methyl ether (PM), triethylene glycol (TEG), dipropylene glycol methyl ether (DPM), diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether and fluorinated diethylene glycol butyl ether.

Formates include methyl formate, ethyl formate, isobutyl formate and tert-butyl formate.

Sulfones and sulfoxides include methylsulfonylmethane (MSM or dimethylsulfone), ethylmethylsulfone, sulfolane and dimethylsulfoxide (DMSO).

Amides include dimethylformamide (DMF), dimethylacetamide (DMA), N-methylpyrrolidone (NMP), 2-pyrrolidone, 1,3-dimethyl-2-imidazolidinone (DMI), hexamethylphosphoramide (HMPA) and N,N'-dimethyl-N,N'-trimethyleneurea (1,3-dimethyl-3,4,5,6-tetrahydro-2(1H)-pyrimidinone (DMPU)).

Alcohols include for example benzylalcohol (BA), ethanol, trifluoroethanol (2,2,2-trifluoroethanol), methanol, isopropanol, t-butanol and n-butanol.

Ketones include for example methylethylketone (MEK) and methyl-isoamylketone (MIAK).

Nitro solvents include nitrobenzene, nitromethane and nitroethane.

Nitrile solvents include acetonitrile, propionitrile, butyronitrile and adiponitrile.

Advantageously, a mixture of solvents is employed, for instance a mixture of organic carbonates or a mixture of one or more organic carbonates and one or more ether or glyme.

Other organic solvents may be employed, for instance common non-polar organic solvents including toluene, hexane, heptane and the like.

Advantageously, present electrolyte compositions comprise
a) an ionic liquid and
b) a protic acid and an organic solvent.

The present electrolyte compositions are advantageously anhydrous, that is containing little or no water. The electrolyte compositions may typically contain ≤10 ppm water, for instance ≤9, ≤8, ≤7, ≤6, ≤5 or ≤4 ppm water by weight, based on the total weight of the electrolyte composition.

The weight/weight ratio of the ionic liquids to the protic acids is for instance from about 99.5/0.5 to about 0.5/99.5, from about 99/1 to about 1/99, from about 95/5 to about 5/95, from about 90/10 to about 10/90, from about 80/20 to about 20/80, from about 70/30 to about 30/70 or from about 60/40 to about 40/60.

The weight/weight ratio of the ionic liquids to the organic solvents is for instance from about 99.5/0.5 to about 0.5/99.5, from about 99/1 to about 1/99, from about 95/5 to about 5/95, from about 90/10 to about 10/90, from about 80/20 to about 20/80, from about 70/30 to about 30/70 or from about 60/40 to about 40/60.

Additives may be incorporated in the electrolyte compositions of the invention.

Additives are for instance selected from the group consisting of corrosion inhibitors, solid electrolyte interface (SEI) improvers, proton evolution improvers, self-discharge inhibitors, anti-gassing agents, viscosity adjusting agents, cathode protection agents, salt stabilizers, conductivity improvers and solvating agents.

Corrosion inhibitors are for example fluorinated oil, sodium stannate, sodium citrate or polyacrylic acids.

Solid electrolyte interface improvers are for instance fluoride sources intended to fluorinate the surface of the metal hydride. Fluoride sources are for instance HF or KF. SEI improvers also include oxides or hydroxides of rare earths such as Y, which inhibit the formation of a thick oxide on the negative electrode. SEI improvers also include metal porphines which serve to reduce oxidation of the alloy surface. For example Ni or Fe porphine. SEI improvers may also incude vinylene carbonate, vinylethylene carbonate, methylene ethylene carbonate and fluoro-ethylene carbonate.

Self-discharge inhibitors include surfactants such as polyglycols, polyglycol alkyl ethers, polyglycol alkyl phosphate esters and polysorbates. Included are polyethylene glycol (PEG), polypropylene glycol, polysorbate 20, polysorbate 40 and polysorbate 80. Advantageously, a mixture of PEG 600 and polysorbate 20 are employed together or a mixture of PEG 600 and ZnO are employed together.

Anti-gassing additives include phosphate ester-based surfactants, propane sultone and fluoropropane sultone.

Viscosity adjusting agents include for instance DMSO.

Additives are for example employed at a level of from about 0.1% to about 15% by weight, based on the total weight of the electrolyte composition.

The present electrolyte compositions will not be limited by the hydrogen and oxygen evolution potential of water. Thus, the metal hydride batteries disclosed may exhibit a nominal open-circuit voltage of >1.2 V (volts). The present MH batteries may supply a nominal open-circuit voltage up to about 6 V. For instance, present MH batteries may exhibit a nominal open-circuit voltage of from about 1.2 to about 6.0 V, from about 1.3 to about 6.0 V, from about 1.4 to about 6.0 V or from about 1.5 to about 6.0 V. For instance, present MH batteries may exhibit a nominal open-circuit voltage of about 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9 or about 6.0 V.

As the electrochemical window is enlarged beyond that of water, further cathode active materials are possible. Further cathode active materials include transition metals and their oxides, hydroxides and fluorides. For example, further cathode active materials include Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt and Au and their oxides, hydroxides, oxide/hydroxides and fluorides.

In further cathode active materials selected from the group consisting of metal oxides, metal hydroxides and metal oxide/hydroxides, nickel may be present at a level of ≤5, ≤10, ≤15, ≤20, ≤25, ≤30, ≤35, ≤40, ≤45, ≤50, ≤55, ≤60, ≤65, ≤70, ≤75, ≤80 or ≤85 atomic percent, for instance ≤90 atomic percent, based on the total metals of the metal oxides, metal hydroxides and metal oxide/hydroxides.

The electrolyte compositions themselves are a further subject of the invention.

U.S. patents, U.S. published patent applications and U.S. patent applications discussed herein are each hereby incorporated by reference.

The articles "a" and an are used herein to refer to one or to more than one (i.e., to at least one) of the grammatical object of the article. By way of example, "an ionic liquid" means one ionic liquid or more than one ionic liquid.

Any ranges cited herein are inclusive.

The terms "substantially" and "about" used throughout this specification are used to describe and account for small fluctuations. For example, they can refer to less than or equal to ±5%, such as less than or equal to ±2%, less than or equal to ±1%, less than or equal to ±0.5%, less than or equal to ±0.2%, less than or equal to ±1% or less than or equal to ±0.05%. All numeric values herein are modified by the term "about," whether or not explicitly indicated. A value modified by the term "about" of course includes the specific value. For instance, "about 5.0" must include 5.0.

Following are some embodiments of the invention.

E1. A metal hydride battery (cell) comprising at least one negative electrode, at least one positive electrode, a casing having said electrodes positioned therein and an electrolyte composition, where the electrolyte composition comprises
a) an ionic liquid and
b) a protic acid and/or an organic solvent.

E2. A battery according to embodiment 1 where the electrolyte composition comprises a protic acid.

E3. A battery according to embodiment 1 or 2 where the electrolyte composition comprises an organic solvent.

E4. A battery according to any of the preceding embodiments where the ionic liquid contains an ammonium or phosphonium cation.

E5. A battery according to any of the preceding embodiments where the ionic liquid contains a cation selected from the group consisting of formulae (a)-(h)

-continued

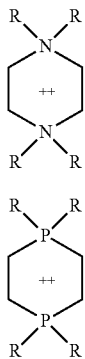

(g)

(h)

where
each R is independently H, $C_1$-$C_{16}$alkyl or hydroxy$C_1$-$C_{16}$alkyl, for instance methyl, ethyl, hydroxyethyl or propyl and
X is $CH_2$, O, S or NR where R is H or $C_1$-$C_{16}$alkyl, for instance H, methyl, ethyl or propyl.

E6. A battery according to any of the preceding embodiments where the ionic liquid contains a cation selected from the group consisting of
$NH_4^+$(ammonium), methylammonium, ethylammonium, dimethylammonium, diethylammonium, trimethylammonium ($NMe_3H^+$), triethylammonium, tributylammonium, diethylmethylammonium, hydroxyethylammonium, methoxymethylammonium, dibutylammonium, methylbutylammonium, anilinium, pyridinium, 2-methylpyridinium, imidazolium, 1-methylimidazolium, 1,2-dimethylimidazolium, imidazolinium, 1-ethylimidazolium, 1-(4-sulfobutyl)-3-methylimidazolium, 1-allylimidazolium, quinolinium, isoquinolinium, pyrrolinium, pyrrolininium or pyrrolidinium;
1-butyl-1-methylpyrrolidinium, tetramethylammonium, tetraethylammonium, tetra-n-butylammonium, n-butyl-tri-ethylammonium, benzyl-tri-methylammonium, tri-n-butylmethylammonium, benzyl-tri-ethylammonium, 1-methylpyridinium, 1-butyl-3,5-dimethylpyridinium, 1,2,4-trimethylpyrazolium, trimethylhydroxyethylammonium (choline), tri-(hydroxyethyl)methylammonium, dimethyl-di(polyoxyethylene)ammonium, 1,2,3-trimethylimidazolium, 1-butyl-3-methylimidazolium, 1-ethyl-2,3-dimethylimidazolium, 1-allyl-3-methylimidazolium, 1-hydroxyethyl-3-methylimidazolium, 1,3-dimethylimidazolium, 1-ethyl-1-methylpiperidinium, 4-ethyl-4-methylmorpholinium, 1-(cyanomethyl)-3-methylimidazolium, 1-(3-cyanopropyl)pyridinium, 1,3-bis(cyanomethyl)imidazolium, 1-hexyl-3-methylimidazolium or 1-ethyl-3-methylimidazolium; and
methyltriphenylphosphonium, tetraphenylphosphonium, tetrabutylphosphonium, tributylmethylphosphonium, triethylmethylphosphonium, trihexyltetradecylphosphonium, triphenylpropylphosphonium or tetrakis(hydroxymethyl)phosphonium;
for instance, the cation is 1-ethyl-3-methylimidazolium, 1-hexyl-3-methylimidazolium, 1-butyl-1-methylpyrrolidinium or trihexyl(tetradecyl)phosphonium.

E7. A battery according to any of the preceding embodiments where the ionic liquid contains an anion selected from the group consisting of carboxylates, imides, methides, nitrate, bifluoride, halides, borates, phosphates, phosphinates, phosphonates, sulfonates, sulfates, carbonates and aluminates.

E8. A battery according to any of the preceding embodiments where the ionic liquid contains an anion selected from the group consisting of $[F_zB(C_mF_{2m+1})_{4-z}]^-$, $[F_yP(C_mF_{2m+1})_{6-y}]^-$, $[(C_mF_{2m+1})_2P(O)O]^-$, $[(C_mF_{2m+1}P(O)O_2]^{2-}$, $[O-C(O)-C_mF_{2m+1}]^-$, $[O-S(O)_2-C_mF_{2m+1}]^-$, $[N(C(O)-C_mF_{2m+1})_2]^-$, $[N(S(O)_2-[(C_mF_{2m+1})_2]^-$, $[N(C(O)-C_mF_{2m+1})(S(O)_2-C_mF_{2m+1})]^-$, $[N(C(O)-C_mF_{2m+1})(C(O)F)]^-$, $[N(S(O)_2-C_mF_{2m+1})(S(O)_2F)]^-$, $[N(S(O)_2F)_2]^-$, $[C(C(O)-C_mF_{2m+1})_3]^-$, $[C(S(O)_2-C_mF_{2m+1})_3]^-$,

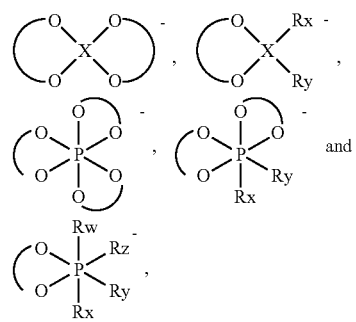

and where
y is an integer of 1 to 6,
m is an integer of 1 to 8, for instance 1 to 4,
z is an integer of 1 to 4,
X is B or Al and
$R_w$, $R_x$, $R_y$ and $R_z$ are independently halogen, $C_1$-$C_{20}$alkyl, $C_1$-$C_{20}$alkyl which is partly or fully fluorinated, $C_1$-$C_{20}$alkoxy, $C_1$-$C_{20}$alkoxy which is partly or fully fluorinated, $C_1$-$C_{20}$alkyl-COO or $C_1$-$C_{20}$alkyl-COO which is partly or fully fluorinated and
O⌒O is independently a bidentate group derived from the —OH groups of a 1,2- or 1,3-diol, a 1,2- or 1,3-dicarboxylic acid or from a 1,2- or 1,3-hydroxycarboxylic acid and
where any one $CF_2$ group may be replaced by O, $S(O)_2$, NR or $CH_2$.

E9. A battery according to any of the preceding embodiments where the ionic liquid contains an anion selected from the group consisting of $F_2P(C_2F_5)_4^-$, $F_3P(C_2F_5)_3^-$, $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$, $F_4P(C_4F_9)_2^-$, perfluoroalkylcarboxylate, perfluoroalkylsulfonate, bis(perfluoroalkylsulfonyl)imide, (perfluoroalkylsulfonyl)(perfluoroalkylcarboxyl)imide, tris(perfluoroalkylsulfonyl)methide, trifluoroacetate, trifluoromethanesulfonate (triflate), bis(trifluoromethylsulfonyl)imide, tris(trifluoromethylsulfonyl)methide, tetrafluoroborate or a spiro-oxo borate or spiro-oxo phosphate, for example bisoxalatoborate (BOB), difluorooxalatoborate (dFOB), di(trifluoroacetato)oxalatoborate (d(Ac)OB), trisoxalatophosphate, tetrafluorooxalatophosphate and di(trifluoroacetato)oxalatoaluminate.

E10. A battery according to embodiment 7 where the ionic liquid contains a carboxylate anion of formula $RCOO^-$ where R is hydrogen or hydrocarbyl; such as formate, acetate (ethanoate), acrylate, propanoate, n-butanoate, i-butanoate, n-pentanoate, i-pentanoate, octanoate, decanoate, benzoate, salicylate, thiosalicylate, 2-, 3- or 4-nitrobenzoate; citrate, oxalate, tartrate, glycolate, gluconate, malate, mandelate, a carboxylate of nitrilotriacetic acid, a carboxylate of N-(2-hydroxyethyl)-ethylenediaminetriacetic acid, a carboxylate of ethylenediaminetetraacetic acid, a carboxylate of diethylenetriaminepentaacetic acid or a haloalkylcarboxylate such as fluoroacetate, difluoroacetate, trifluoroacetate, chloroacetate, dichloroacetate or trichloroacetate.

E11. A battery according to embodiment 7 where the ionic liquid contains an imide anion such as dicyanamide, $N(SO_2F)_2^-$ ((bisfluorosulfonyl)imide), a bis(perfluoroalkylsulfonyl)imide such as $[N(SO_2CF_3)_2]^-$ (bistriflimide), bis(pentafluoroethylsulfonyl)imide or $N(CF_3SO_2)(CF_3(CF_2)_3SO_2)^-$ or a (perfluoroalkylsulfonyl)(perfluoroalkylcarboxyl)imide; or a methide such as a tris(perfluoroalkylsulfonyl)methide, for example tris(trifluoromethylsulfonyl)methide, $C(CF_3SO_2)_3^-$; or bifluoride ($HF_2^-$); or chloride, bromide, iodide or fluoride; or a borate such as orthoborate, tetrahydroxyborate, tetraborate, tetraphenylborate, $[B(3,5-(CF_3)_2C_6H_3)_4]^-$ (BARF), $B(C_2O_4)_2^-$ (bis(oxalato)borate) (BOB), difluoro(oxalato)borate (dFOB), di(trifluoroacetato)oxalatoborate (D(Ac)OB), $B(C_6F_5)_4^-$ or $BF_4^-$ (tetrafluoroborate); or a phosphate such as dihydrogen phosphate, hydrogen phosphate, alkyl phosphate, dialkyl phosphate, phosphate, $PF_6^-$ (hexafluorophosphate), $HPO_3F^-$ (fluorohydrogen phosphate), trisoxalatophosphate (TOP), tetrafluorooxalatophosphate (TFOP) or a fluoro(perfluoroalkyl)phosphate such as $F_2P(C_2F_5)_4^-$, $F_3P(C_2F_5)_3^-$ (tris(pentafluoroethyl)trifluorophosphate or FAP), $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$ or $F_4P(C_4F_9)_2^-$; or a sulfonate such as an alkylsulfonate, arylsulfonate or perfluoroalkylsulfonate, for instance trifluoromethanesulfonate (triflate), p-toluenesulfonate (tosylate) or methanesulfonate (mesylate); or a sulfate such as hydrogensulfate, sulfate, thiosulfate or an alkylsulfate such as methylsulfate or ethylsulfate; or a carbonate anion such as carbonate, hydrogencarbonate or an alkylcarbonate such as methylcarbonate, ethylcarbonate or butylcarbonate; or an aluminate such as $Al(OC(CF_3)_3)_4^-$, di(trifluoroacetato) oxalatoaluminate (d(Ac)OAl), tetrachloroaluminate, tetrafluoroaluminate, tetraiodoaluminate or tetrabromoaluminate.

E12. A battery according to any of embodiments 1-3 where the ionic liquid is selected from the group consisting of diethylmethylammonium trifluoromethanesulfonate (DEMA TfO), ethylammonium nitrate, triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium hydrogensulfate, 1-methylimidazolium chloride, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonum dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride and dimethylammonium bifluoride.

E13. A battery according to any of embodiments 1-3 where the ionic liquid is selected from the group consisting of 1-ethyl-3-methylimidazolium trifluoromethanesulfonate (EMIM TfO), 1-ethyl-3-methylimidazolium tetrafluoroborate (EMIM $BF_4$), 1-ethyl-3-methylimidazolium bis(trifluoromethylsulfonyl)imide (EMIM TFSI), 1-ethyl-3-methylimidazolium acetate (EMIM Ac), 1-butyl-3-methylimidazolium trifluoromethanesulfonate (BMIM TfO), 1-butyl-3-methylimidazolium acetate (BMIM Ac), 1-butyl-3-methylimidazolium bis(trifluoromethylsulfonyl) imide (BMIM TFSI), tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogencarbonate, 1-butyl-3-methylimidazolium hydrogensulfate, 1-butyl-3-methylimidazolium chloride, 1,2,3-trimethylimidazolium methylsulfate, tris-(hydroxyethyl)methylammonium methylsulfate, 1,2,4-trimethylpyrazolium methylsulfate, 1,3-dimethylimdiazolium hydrogencarbonate, 1-ethyl-3-methylimidazolium hydrogencarbonate, 1-ethyl-3-methylimidazolium chloride, 1-ethyl-3-methylimidazolium tetrachloroaluminate, 1-ethyl-3-methylimidazolium thiocyanate, 1-ethyl-3-methylimidazolium methanesulfonate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium hexafluorophosphate, 1-butyl-3,5-dimethylpyridinium bromide, 1-ethyl-3-methylimidazolium bis(pentafluoroethylsulfonyl)imide, 1-ethyl-2,3-dimethylimidazolium methylcarbonate, carboxymethyl-tributylphosphonium bis (trifluoromethylsulfonyl)imide, N-carboxyethylmethylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis (trifluromethylsulfonyl)imide, tetrabutylphosphonium methanesulfonate, triethylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylphosphonium dibutylphosphate, triethylmethylphosphonium dibutylphosphate, tetrabutylphosphonium tetrafluoroborate, tetrabutylphosphonium p-toluenesulfonate, tributylmethylphosphonium methylcarbonate, 1-ethyl-3-methylimidazolium hydrogencarbonate, tributylmethylammonium methylcarbonate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl)pyridinium chloride, 1-(3-cyanopropyl)pyridinium bis(trifluoromethylsulfonyl)imide, 1,3-bis(cyanomethyl)imidazolium chloride, 1,3-bis(cyanomethyl)imidazolium bis(trifluoromethylsulfonyl)imide, 1,3-bis(cyanopropyl)imidazolium chloride, 1,3-bis(3-cyanopropyl)imidazolium bis(trifluoromethylsulfonyl)imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3-methylimidazolium chloride, tributylmethylphosphonium methylsulfate, triethylmethylphosphonium dibutylphosphate, trihexyltetradecylphosphonium bis(trifluromethylsulfonyl)imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate and 3-(triphenylphosphonio)propane-1-sulfonic acid tosylate.

E14. A battery according to any of the preceding embodiments where the electrolyte composition comprises a protic acid such as
hydrochloric acid, nitric acid, phosphoric acid, sulfuric acid, boric acid, hydrofluoric acid, hydrobromic acid, hydroiodic acid, perchloric acid or periodic acid; or
a bisulfate such as sodium bisulfate, potassium bisulfate or ammonium bisulfate; or
$HAsF_6$, $HBF_4$, $H(OEt_2)BF_4$, $HPF_6$, $H[N(SO_2CF_3)_2]$ or $H[N(SO_2CF_2CF_3)_2]$.

E15. A battery according to any of the preceding embodiments where the electrolyte composition comprises an organic protic acid such as a carboxylic acid of formula RCOOH where R is hydrogen or hydrocarbyl, for example formic acid, acetic acid, acrylic acid, fluoroacetic acid, difluoroacetic acid, trifluoroacetic acid, chloroacetic acid, dichloroacetic acid, trichloroacetic acid, propanoic acid, butyric acid, 3-methylbutanoic acid, valeric acid, hexanoic acid, heptanoic acid, caprylic acid, nonanoic acid, benzoic acid, salicylic acid, 2-, 3- or 4-nitrobenzoic acid; citric acid, oxalic acid, tartaric acid, glycolic acid, gluconic acid, malic acid, mandelic acid, nitrilotriacetic acid, N-(2-hydroxyethyl)-ethylenediaminetriacetic acid, ethylenediaminetetraacetic acid or diethyleneaminepentaacetic acid.

E16. A battery according to any of the preceding embodiments where the electrolyte composition comprises a protic sulfonic acid of formula $RSO_3H$ where R is alkyl or aryl or alkyl or aryl substituted by one to three halogens, such as p-toluenesulfonic acid, phenylsulfonic acid, methanesulfonic acid or trifluoromethanesulfonic acid.

E17. A battery according to any of the preceding embodiments where the electrolyte composition comprises a protic acid which is an oxonium ion associated with a highly non-coordinating ion such as Brookhart's acid (BARF acid), $[H(OEt_2)_2][B[3,5-(CF_3)_2C_6H_3]_4]$, $[H(OEt_2)_2][B(C_6F_5)_4]$ (oxonium acid) or $[H(OEt_2)_2][Al(OC(CF_3)_3)_4]$.

E18. A battery according to any of the preceding embodiments where the electrolyte composition comprises an organic solvent, for instance an organic solvent selected from the group consisting of organic carbonates, ethers, glymes, ortho esters, polyalkylene glycols, esters, lactones, glycols, formates, sulfones, sulfoxides, amides, alcohols, ketones, nitro solvents, nitrile solvents and combinations thereof.

E19. A battery according to any of the preceding embodiments where the electrolyte composition comprises an organic solvent such as an organic carbonate, for example a cyclic or acyclic organic carbonate such as ethylene carbonate (EC), propylene carbonate (PC), trimethylene carbonate, 1,2-butylene carbonate (BC), dimethyl carbonate (DMC), diethyl carbonate (DEC), ethylmethyl carbonate (EMC), vinylene carbonate, difluoroethylene carbonate or monofluoroethylene carbonate; or an ether or glyme such as dimethoxymethane (DMM), diethoxymethane, 1,2-dimethoxyethane (DME or ethyleneglycol dimethylether or glyme), diglyme, triglyme, tetraglyme, ethyleneglycol diethylether (DEE), ethyleneglycol dibutylether, diethyleneglycol diethylether, tetrahydrofuran (THF), 2-methyltetrahydrofuran (2-MeTHF), 1,3-dioxane, 1,3-dioxolane (DIOX), 4-methyl-1,3-dioxolane (4-MeDIOX), 2-methyl-1,3-dioxolane (2-MeDIOX), 1,4-dioxane, dimethylether, ethylmethylether, diethylether, di-n-butylether, di-t-butylether, di-isopropylether, methyl-t-butylether, ethyl-t-butylether or t-amyl-methylether; or an ortho ester such as trimethoxymethane, triethoxymethane, 1,4-dimethyl-3,5,8-trioxabicyclo[2.2.2]octane or 4-ethyl-1-methyl-3,5,8-trioxabicyclo[2.2.2]octane; or a polyalkylene glycol, that is a homo- or cooligomer or homo- or copolymer of $C_1$-$C_4$alkylene glycols, such as polyethylene glycol (PEG) or monomethyl, dimethyl or diethyl (end-capped) polyethylene glycol with weight average molecular weights (Mw) for example from about 200 to about 1200 g/mol, from about 200 to about 1000 g/mol, from about 200 to about 900 g/mol, from about 200 to about 700 g/mol or from about 200 to about 500 g/mol, for example oligomers of 4 monomers or more, for instance tetraethylene glycol, fluorinated tetraethylene glycol or tetrapropylene glycol, for instance PEG 200, PEG 300, PEG 400, PEG 500, PEG 600, PEG 700, PEG 800, PEG 900 or PEG 1000; or an ester or lactone such as γ-butyrolactone (GBL), γ-valerolactone, δ-valerolactone, ethyl acetate (EA), 2-methoxyethyl acetate, 2-ethoxyethyl acetate, 2-butoxyethyl acetate, 2-(2-butoxyethoxy)ethyl acetate (diethylene glycol butyl ether acetate, DBA), ethylene glycol diacetate (EGDA), 3-ethoxy ethyl propionate (EEP), methyl butyrate (MB), n-amyl acetate (NAAC), propylene glycol methyl ether acetate (PMA), ethyl butryate (EB), diethyl malonate or dimethyl malonate; or a dibasic ester mixture such as methyl esters of adipic, glutaric or succinic acids; or a glycol such as ethylene glycol, propylene glycol, 2-methoxyethanol, 2-ethoxyethanol, 2-propoxyethanol, 2-isopropoxyethanol, 2-butoxyethanol (ethylene glycol butyl ether, EB), 2-phenoxyethanol, 2-benzyloxyethanol, 2-(2-methoxyethoxy)ethanol, 2-(2-ethoxyethoxy)ethanol, 2-(2-butoxyethoxy)ethanol (diethylene glycol butyl ether, DB), propylene glycol butyl ether (PB), propylene glycol methyl ether (PM), triethylene glycol (TEG), dipropylene glycol methyl ether (DPM), diethylene glycol methyl ether, 1,3-butanediol, 1,4-butanediol, 1,5-pentanediol, perfluoro- 1,4-butanediol, perfluoro-1,5-butanediol, fluorinated diethylene glycol methyl ether, fluorinated triethylene glycol, fluorinated triethylene glycol methyl ether or fluorinated diethylene glycol butyl ether; or a formate such as methyl formate, ethyl formate, isobutyl formate or tert-butyl formate; or a sulfone or sulfoxide such as methylsulfonylmethane (MSM or dimethylsulfone), ethylmethylsulfone, sulfolane or dimethylsulfoxide (DMSO); or an amide such as dimethylformamide (DMF), dimethylacetamide (DMA), N-methylpyrrolidone (NMP), 2-pyrrolidone, 1,3-dimethyl-2-imidazolidinone (DMI), hexamethylphosphoramide (HMPA) or N,N'-dimethyl-N,N'-trimethyleneurea (1,3-dimethyl-3,4,5,6-tetrahydro-2(1H)-pyrimidinone (DMPU)); or an alcohol such as benzylalcohol (BA), ethanol, trifluoroethanol (2,2,2-trifluoroethanol), methanol, isopropanol, t-butanol or n-butanol; or a ketone such as methylethylketone (MEK) or methylisoamylketone (MIAK); or a nitro solvent such as nitrobenzene, nitromethane or nitroethane; or a nitrile solvent such as acetonitrile, propionitrile, butyronitrile or adiponitrile.

E20. A battery according to any of the preceding embodiments where the electrolyte composition contains ≤10 ppm water or ≤9, ≤8, ≤7, ≤6, ≤5 or ≤4 ppm water by weight, based on the total weight of the electrolyte composition.

E21. A battery according to any of the preceding embodiments where the electrolyte composition comprises a protic acid and the weight/weight ratio of the ionic liquids in total to the protic acids in total is for instance from about 99.5/0.5 to about 0.5/99.5, from about 99/1 to about 1/99, from about 95/5 to about 5/95, from about 90/10 to about 10/90, from about 80/20 to about 20/80, from about 70/30 to about 30/70 or from about 60/40 to about 40/60.

E22. A battery according to any of the preceding embodiments where the electrolyte composition comprises an organic solvent and the weight/weight ratio of the ionic liquids in total to the organic solvents in total is for instance from about 99.5/0.5 to about 0.5/99.5, from about 99/1 to about 1/99, from about 95/5 to about 5/95, from about 90/10 to about 10/90, from about 80/20 to about 20/80, from about 70/30 to about 30/70 or from about 60/40 to about 40/60.

E23. A battery according to any of the preceding embodiments where the electrolyte composition contains one or more additives, for instance one or more additives selected from the group consisting of corrosion inhibitors, solid electrolyte interface (SEI) improvers, proton evolution improvers, self-discharge inhibitors, anti-gassing agents, viscosity adjusting agents, cathode protection agents, salt stabilizers, conductivity improvers and solvating agents.

E24. A battery according to any of the preceding embodiments where the electrolyte composition contains one or more additives selected from the group consisting of fluorinated oil, sodium stannate, sodium citrate or polyacrylic acids;

HF or KF, oxides or hydroxides of rare earths such as Y, metal porphines, for example Ni or Fe porphine, vinylene carbonate, vinylethylene carbonate, methylene ethylene carbonate or fluoro-ethylene carbonate;

polyglycols, polyglycol alkyl ethers, polyglycol alkyl phosphate esters or polysorbates such as polyethylene glycol (PEG), polypropylene glycol, polysorbate 20, polysorbate 40 or polysorbate 80 or a mixture of PEG 600 and polysorbate 20 or a mixture of PEG 600 and ZnO;

phosphate ester-based surfactants, propane sultone or fluoropropane sultone; and

DMSO;

for example at a level of from about 0.1% to about 15% by weight, based on the total weight of the electrolyte composition.

E25. A metal hydride battery according to any of the preceding embodiments which exhibits a nominal open-circuit voltage of >1.2 V (volts) and up to about 6 V or from about 1.2 to about 6.0 V, from about 1.3 to about 6.0 V, from about 1.4 to about 6.0 V or from about 1.5 to about 6.0 V or about 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9 or about 6.0 V.

E26. A battery according to any of the preceding embodiments where the positive electrode comprises one or more cathode active materials selected from the group consisting of transition metals, transition metal oxides, transition metal hydroxides, transition metal oxide/hydroxides and transition metal fluorides.

E27. A battery according to any of the preceding embodiments where the positive electrode comprises one or more cathode active materials selected from the group consisting of transition metals, transition metal oxides, transition metal hydroxides, transition metal oxide/hydroxides and transition metal fluorides, where in the metal oxides, metal hydroxides and metal oxide/hydroxides, nickel may be present at a level of ≤5, ≤10, ≤15, ≤20, ≤25, ≤30, ≤35, ≤40, ≤45, ≤50, ≤55, ≤60, ≤65, ≤70, ≤75, ≤80 or ≤85 atomic percent, for instance ≤90 atomic percent, based on the total metals of the metal oxides, metal hydroxides and metal oxide/hydroxides.

E28. A battery according to any of the preceding embodiments where the positive electrode comprises one or more cathode active materials selected from the group consisting of transition metals, transition metal oxides, transition metal hydroxides, transition metal oxide/hydroxides and transition metal fluorides; for example, one or more cathode active materials selected from the group consisting of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;

oxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;

hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;

oxide/hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au and fluorides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au.

Following are more embodiments of the invention.

E1. A metal hydride battery (cell) comprising at least one negative electrode, at least one positive electrode, a casing having said electrodes positioned therein and an electrolyte composition, where the positive electrode comprises one or more cathode active materials selected from the group consisting of transition metals, transition metal oxides, transition metal hydroxides, transition metal oxide/hydroxides and transition metal fluorides;

where in the metal oxides, metal hydroxides and metal oxide/hydroxides, nickel generally is present at a level of ≤5, ≤10, ≤15, ≤20, ≤25, ≤30, ≤35, ≤40, ≤45, ≤50, ≤55, ≤60, ≤65, ≤70, ≤75, ≤80 or ≤85 atomic percent, for instance ≤90 atomic percent, based on the total metals of the metal oxides, metal hydroxides and metal oxide/hydroxides.

E2. A battery according to embodiment 1 where the cathode active materials are selected from the group consisting of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;

oxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;

hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;

oxide/hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au and fluorides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au.

E3. A battery according to embodiments 1 or 2 where the electrolyte composition comprises an ionic liquid.

E4. A battery according to any of the preceding embodiments where the electrolyte composition comprises a protic acid.

E5. A battery according to any of the preceding embodiments where the electrolyte composition comprises an organic solvent.

E6. A battery according to any of the preceding embodiments where the electrolyte composition comprises an ionic liquid which contains an ammonium or phosphonium cation.

E7. A battery according to any of the preceding embodiments where the electrolyte composition comprises an ionic liquid which contains a cation selected from the group consisting of formulae (a)-(h)

$^+$N(R)$_4$ (a)

$^+$P(R)$_4$ (b)

 (c)

 (d)

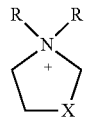 (e)

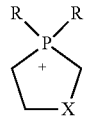 (f)

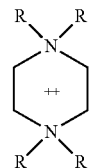 (g)

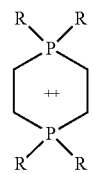 (h)

where
each R is independently H, $C_1$-$C_{16}$alkyl or hydroxy$C_1$-$C_{16}$alkyl, for instance methyl, ethyl, hydroxyethyl or propyl and X is $CH_2$, O, S or NR where R is H or $C_1$-$C_{16}$alkyl, for instance H, methyl, ethyl or propyl.

E8. A battery according to any of the preceding embodiments where the electrolyte composition comprises an ionic liquid which contains a cation selected from the group consisting of $NH_4^+$(ammonium), methylammonium, ethylammonium, dimethylammonium, diethylammonium, trimethylammonium ($NMe_3H^+$), triethylammonium, tributylammonium, diethylmethylammonium, hydroxyethylammonium, methoxymethylammonium, dibutylammonium, methylbutylammonium, anilinium, pyridinium, 2-methylpyridinium, imidazolium, 1-methylimidazolium, 1,2-dimethylimidazolium, imidazolinium, 1-ethylimidazolium, 1-(4-sulfobutyl)-3-methylimidazolium, 1-allylimidazolium, quinolinium, isoquinolinium, pyrrolinium, pyrrolininium or pyrrolidinium;

1-butyl-1-methylpyrrolidinium, tetramethylammonium, tetraethylammonium, tetra-n-butylammonium, n-butyl-tri-ethylammonium, benzyl-tri-methylammonium, tri-n-butylmethylammonium, benzyl-tri-ethylammonium, 1-methylpyridinium, 1-butyl-3,5-dimethylpyridinium, 1,2,4-trimethylpyrazolium, trimethylhydroxyethylammonium (choline), tri-(hydroxyethyl)methylammonium, dimethyl-di(polyoxyethylene)ammonium, 1,2,3-trimethylimidazolium, 1-butyl-3-methylimidazolium, 1-ethyl-2,3-dimethylimidazolium, 1-allyl-3-methylimidazolium, 1-hydroxyethyl-3-methylimidazolium, 1,3-dimethylimidazolium, 1-ethyl-1-methylpiperidinium, 4-ethyl-4-methylmorpholinium, 1-(cyanomethyl)-3-methylimidazolium, 1-(3-cyanopropyl)pyridinium, 1,3-bis(cyanomethyl)imidazolium, 1-hexyl-3-methylimidazolium or 1-ethyl-3-methylimidazolium; and methyltriphenylphosphonium, tetraphenylphosphonium, tetrabutylphosphonium, tributylmethylphosphonium, triethylmethylphosphonium, trihexyltetradecylphosphonium, triphenylpropylphosphonium or tetrakis(hydroxymethyl)phosphonium;

for instance, the cation is 1-ethyl-3-methylimidazolium, 1-hexyl-3-methylimidazolium, 1-butyl-1-methylpyrrolidinium or trihexyl(tetradecyl)phosphonium.

E9. A battery according to any of the preceding embodiments where the electrolyte composition comprises an ionic liquid which contains an anion selected from the group consisting of carboxylates, imides, methides, nitrate, bifluoride, halides, borates, phosphates, phosphinates, phosphonates, sulfonates, sulfates, carbonates and aluminates.

E10. A battery according to any of the preceding embodiments where the electrolyte composition comprises an ionic liquid which contains an anion selected from the group consisting of

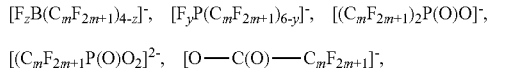

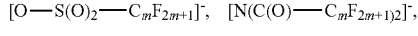

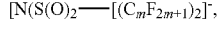

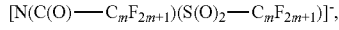

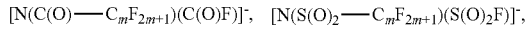

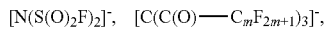

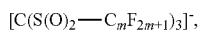

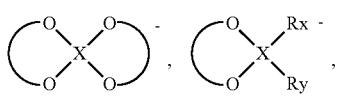,  and

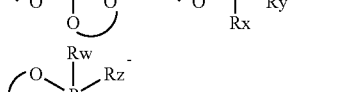, where
y is an integer of 1 to 6,
m is an integer of 1 to 8, for instance 1 to 4,
z is an integer of 1 to 4,
X is B or Al and
$R_w$, $R_x$, $R_y$ and $R_z$ are independently halogen, $C_1$-$C_{20}$alkyl, $C_1$-$C_{20}$alkyl which is partly or fully fluorinated, $C_1$-$C_{20}$alkoxy, $C_1$-$C_{20}$alkoxy which is partly or fully fluorinated, $C_1$-$C_{20}$alkyl-COO or $C_1$-$C_{20}$alkyl-COO which is partly or fully fluorinated and
O⌒O O is independently a bidentate group derived from the —OH groups of a 1,2- or 1,3-diol, a 1,2- or 1,3-dicarboxylic acid or from a 1,2- or 1,3-hydroxycarboxylic acid and
where any one $CF_2$ group may be replaced by O, $S(O)_2$, NR or $CH_2$.

E11. A battery according to any of the preceding embodiments where the electrolyte composition comprises an ionic liquid containing an anion selected from the group consisting of $F_2P(C_2F_5)_4^-$, $F_3P(C_2F_5)_3^-$, $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$, $F_4P(C_4F_9)_2^-$, perfluoroalkylcarboxylate, perfluoroalkylsulfonate, bis(perfluoroalkylsulfonyl)imide, (perfluoroalkylsulfonyl)(perfluoroalkylcarboxyl)imide, tris(perfluoroalkylsulfonyl)methide, trifluoroacetate, trifluoromethanesulfonate (triflate), bis(trifluoromethylsulfonyl)imide, tris(trifluoromethylsulfonyl)methide, tetrafluoroborate or a spiro-oxo borate or spiro-oxo phosphate, for example bisoxalatoborate (BOB), difluorooxalatoborate (dFOB), di(trifluoroacetato)oxalatoborate (d(Ac)OB), trisoxalatophosphate, tetrafluorooxalatophosphate and di(trifluoroacetato) oxalatoaluminate.

E12. A battery according to embodiment 9 where the electrolyte composition comprises an ionic liquid which contains a carboxylate anion of formula $RCOO^-$ where R is hydrogen or hydrocarbyl; such as formate, acetate (ethanoate), acrylate, propanoate, n-butanoate, i-butanoate, n-pentanoate, i-pentanoate, octanoate, decanoate, benzoate, salicylate, thiosalicylate, 2-, 3- or 4-nitrobenzoate; citrate, oxalate, tartrate, glycolate, gluconate, malate, mandelate, a carboxylate of nitrilotriacetic acid, a carboxylate of N-(2-hydroxyethyl)-ethylenediaminetriacetic acid, a carboxylate of ethylenediaminetetraacetic acid, a carboxylate of diethylenetriaminepentaacetic acid or a haloalkylcarboxylate such as fluoroacetate, difluoroacetate, trifluoroacetate, chloroacetate, dichloroacetate or trichloroacetate.

E13. A battery according to embodiment 9 where the electrolyte composition comprises an ionic liquid which contains
an imide anion such as dicyanamide, $N(SO_2F)_2^-$ ((bisfluorosulfonyl)imide), a bis(perfluoroalkylsulfonyl)imide such as $[N(SO_2CF_3)_2]^-$ (bistriflimide), bis(pentafluoroethylsulfonyl)imide or $N(CF_3SO_2)(CF_3(CF_2)_3SO_2)^-$ or a (perfluoroalkylsulfonyl)(perfluoroalkylcarboxyl)imide; or
a methide such as a tris(perfluoroalkylsulfonyl)methide, for example tris(trifluoromethylsulfonyl)methide, $C(CF_3SO_2)_3^-$; or
bifluoride ($HF_2^-$); or
chloride, bromide, iodide or fluoride; or
a borate such as orthoborate, tetrahydroxyborate, tetraborate, tetraphenylborate, $[B(3,5-(CF_3)_2C_6H_3)_4]^-$ (BARF), $B(C_2O_4)_2^-$ (bis(oxalato)borate) (BOB), difluoro(oxalato)borate (dFOB), di(trifluoroacetato)oxalatoborate (D(Ac)OB), $B(C_6F_5)_4^-$ or $BF_4^-$ (tetrafluoroborate); or
a phosphate such as dihydrogen phosphate, hydrogen phosphate, alkyl phosphate, dialkyl phosphate, phosphate, $PF_6^-$ (hexafluorophosphate), $HPO_3F^-$ (fluorohydrogen phosphate), trisoxalatophosphate (TOP), tetrafluorooxalatophosphate (TFOP) or a fluoro(perfluoroalkyl)phosphate such as $F_2P(C_2F_5)_4^-$, $F_3P(C_2F_5)_3^-$ (tris(pentafluoroethyl)trifluorophosphate or FAP), $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$ or $F_4P(C_4F_9)_2^-$; or
a sulfonate such as an alkylsulfonate, arylsulfonate or perfluoroalkylsulfonate, for instance trifluoromethanesulfonate (triflate), p-toluenesulfonate (tosylate) or methanesulfonate (mesylate); or
a sulfate such as hydrogensulfate, sulfate, thiosulfate or an alkylsulfate such as methylsulfate or ethylsulfate; or
a carbonate anion such as carbonate, hydrogencarbonate or an alkylcarbonate such as methylcarbonate, ethylcarbonate or butylcarbonate; or
an aluminate such as $Al(OC(CF_3)_3)_4^-$, di(trifluoroacetato) oxalatoaluminate (d(Ac)OAl), tetrachloroaluminate, tetrafluoroaluminate, tetraiodoaluminate or tetrabromoaluminate.

E14. A battery according to any of embodiments 1-5 where the electrolyte composition comprises an ionic liquid selected from the group consisting of diethylmethylammonium trifluoromethanesulfonate (DEMA TfO), ethylammonium nitrate, triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium hydrogensulfate, 1-methylimidazolium chloride, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonium dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride and dimethylammonium bifluoride.

E15. A battery according to any of embodiments 1-5 where the electrolyte composition comprises an ionic liquid selected from the group consisting of 1-ethyl-3-methylimidazolium trifluoromethanesulfonate (EMIM TfO), 1-ethyl-3-methylimidazolium tetrafluoroborate (EMIM $BF_4$), 1-ethyl-3-methylimidazolium bis(trifluoromethylsulfonyl)imide (EMIM TFSI), 1-ethyl-3-methylimidazolium acetate (EMIM Ac), 1-butyl-3-methylimidazolium trifluoromethanesulfonate (BMIM TfO), 1-butyl-3-methylimidazolium acetate (BMIM Ac), 1-butyl-3-methylimidazolium bis(trifluoromethylsulfonyl)imide (BMIM TFSI), tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogencarbonate, 1-butyl-3-methylimidazolium hydrogensulfate, 1-butyl-3-methylimidazolium chloride, 1,2,3-trimethylimidazolium methylsulfate, tris-(hydroxyethyl)methylammonium methylsulfate, 1,2,4-trimethylpyrazolium methylsulfate, 1,3-dimethylimdiazolium hydrogencarbonate, 1-ethyl-3-methylimidazolium hydrogencarbonate, 1-ethyl-3-methylimidazolium chloride, 1-ethyl-3-methylimidazolium tetrachloroaluminate, 1-ethyl-3-methylimidazolium thiocyanate, 1-ethyl-3-methylimidazolium methanesulfonate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium hexafluorophosphate, 1-butyl-3,5-dimethylpyridinium bromide, 1-ethyl-3-methylimidazolium bis(pentafluoroethylsulfonyl)imide, 1-ethyl-2,3-dimethylimidazolium methylcarbonate, carboxymethyl-tributylphosphonium bis(trifluoromethylsulfonyl)imide, N-carboxymethylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis(trifluromethylsulfonyl)imide, tetrabutylphosphonium methanesulfonate, triethylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylphosphonium dibutylphosphate, triethylmethylphosphonium dibutylphosphate, tetrabutylphosphonium tetrafluoroborate, tetrabutylphosphonium p-toluenesulfonate, tributylmethylphosphonium methylcarbonate, 1-ethyl-3-methylimidazolium hydrogencarbonate, tributylmethylammonium methylcarbonate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl)pyridinium chloride, 1-(3-cyanopropyl)pyridinium bis(trifluoromethylsulfonyl)imide, 1,3-bis(cyanomethyl)imidazolium chloride, 1,3-bis(cyanomethyl)imidazolium bis(trifluoromethylsulfonyl)imide, 1,3-bis(cyanopropyl)imidazolium chloride, 1,3-bis(3-cyanopropyl)imidazolium bis(trifluoromethylsulfonyl)imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3-methylimidazolium chloride, tributylmethylphosphonium methylsulfate, triethylmethylphosphonium dibutylphosphate, trihexyltetradecylphosphonium bis(trifluromethylsulfonyl)imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate and 3-(triphenylphosphonio)propane-1-sulfonic acid tosylate.

E16. A battery according to any of the preceding embodiments where the electrolyte composition comprises a protic acid such as hydrochloric acid, nitric acid, phosphoric acid, sulfuric acid, boric acid, hydrofluoric acid, hydrobromic acid, hydroiodic acid, perchloric acid or periodic acid; or a bisulfate such as sodium bisulfate, potassium bisulfate or ammonium bisulfate; or $HAsF_6$, $HBF_4$, $H(OEt_2)BF_4$, $HPF_6$, $H[N(SO_2CF_3)_2]$ or $H[N(SO_2CF_2CF_3)_2]$.

E17. A battery according to any of the preceding embodiments where the electrolyte composition comprises a carboxylic protic acid of formula RCOOH where R is hydrogen or hydrocarbyl.

E18. A battery according to any of the preceding embodiments where the electrolyte composition comprises a protic sulfonic acid of formula $RSO_3H$ where R is alkyl or aryl or alkyl or aryl substituted by one to three halogens, such as p-toluenesulfonic acid, phenylsulfonic acid, methanesulfonic acid or trifluoromethanesulfonic acid.

E19. A battery according to any of the preceding embodiments where the electrolyte composition comprises a protic acid which is an oxonium ion associated with a highly non-coordinating ion such as Brookhart's acid (BARF acid), $[H(OEt_2)_2][B[3,5-(CF_3)_2C_6H_3]_4]$, $[H(OEt_2)_2][B(C_6F_5)_4]$ (oxonium acid) or $[H(OEt_2)_2][Al(OC(CF_3)_3)_4]$.

E20. A battery according to any of the preceding embodiments where the electrolyte composition comprises an organic solvent, for instance an organic solvent selected from the group consisting of organic carbonates, ethers, glymes, ortho esters, polyalkylene glycols, esters, lactones, glycols, formates, sulfones, sulfoxides, amides, alcohols, ketones, nitro solvents, nitrile solvents and combinations thereof.

E21. A battery according to any of the preceding embodiments where the electrolyte composition comprises an organic solvent such as an organic carbonate, for example a cyclic or acyclic organic carbonate such as ethylene carbonate (EC), propylene carbonate (PC), trimethylene carbonate, 1,2-butylene carbonate (BC), dimethyl carbonate (DMC), diethyl carbonate (DEC), ethylmethyl carbonate (EMC), vinylene carbonate, difluoroethylene carbonate or monofluoroethylene carbonate; or an ether or glyme such as dimethoxymethane (DMM), diethoxymethane, 1,2-dimethoxyethane (DME or ethyleneglycol dimethylether or glyme), diglyme, triglyme, tetraglyme, ethyleneglycol diethylether (DEE), ethyleneglycol dibutylether, diethyleneglycol diethylether, tetrahydrofuran (THF), 2-methyltetrahydrofuran (2-MeTHF), 1,3-dioxane, 1,3-dioxolane (DIOX), 4-methyl-1,3-dioxolane (4-MeDIOX), 2-methyl-1,3-dioxolane (2-MeDIOX), 1,4-dioxane, dimethylether, ethylmethylether, diethylether, di-n-butylether, di-t-butylether, di-isopropylether, methyl-t-butylether, ethyl-t-butylether or t-amyl-methylether; or an ortho ester such as trimethoxymethane, triethoxymethane, 1,4-dimethyl-3,5,8-trioxabicyclo[2.2.2]octane or 4-ethyl-1-methyl-3,5,8-trioxabicyclo[2.2.2]octane; or a polyalkylene glycol, that is a homo- or cooligomer or homo- or copolymer of $C_1$-$C_4$alkylene glycols, such as polyethylene glycol (PEG) or monomethyl, dimethyl or diethyl (end-capped) polyethylene glycol with weight average molecular weights (Mw) for example from about 200 to about 1200 g/mol, from about 200 to about 1000 g/mol, from about 200 to about 900 g/mol, from about 200 to about 700 g/mol or from about 200 to about 500 g/mol, for example oligomers of 4 monomers or more, for instance tetraethylene glycol, fluorinated tetraethylene glycol or tetrapropylene glycol, for instance PEG 200, PEG 300, PEG 400, PEG 500, PEG 600, PEG 700, PEG 800, PEG 900 or PEG 1000; or an ester or lactone such as γ-butyrolactone (GBL), γ-valerolactone, δ-valerolactone, ethyl acetate (EA), 2-methoxyethyl acetate, 2-ethoxyethyl acetate, 2-butoxyethyl acetate, 2-(2-butoxyethoxy)ethyl acetate (diethylene glycol butyl ether acetate, DBA), ethylene glycol diacetate (EGDA), 3-ethoxy ethyl propionate (EEP), methyl butyrate (MB), n-amyl acetate (NAAC), propylene glycol methyl ether acetate (PMA), ethyl butryate (EB), diethyl malonate or dimethyl malonate; or a dibasic ester mixture such as methyl esters of adipic, glutaric or succinic acids; or a glycol such as ethylene glycol, propylene glycol, 2-methoxyethanol, 2-ethoxyethanol, 2-propoxyethanol, 2-isopropoxyethanol, 2-butoxyethanol (ethylene glycol butyl ether, EB), 2-phenoxyethanol, 2-benzyloxyethanol, 2-(2-methoxyethoxy)ethanol, 2-(2-ethoxyethoxy)ethanol, 2-(2-butoxyethoxy)ethanol (diethylene glycol butyl ether, DB), propylene glycol butyl ether (PB), propylene glycol methyl ether (PM), triethylene glycol (TEG), dipropylene glycol methyl ether (DPM), diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether or fluorinated diethylene glycol butyl ether; or a formate such as methyl formate, ethyl formate, isobutyl formate or tert-butyl formate; or a sulfone or sulfoxide such as methylsulfonylmethane (MSM or dimethylsulfone), ethylmethylsulfone, sulfolane or dimethylsulfoxide (DMSO); or an amide such as dimethylformamide (DMF), dimethylacetamide (DMA), N-methylpyrrolidone (NMP), 2-pyrrolidone, 1,3-dimethyl-2-imidazolidinone (DMI), hexamethylphosphoramide (HMPA) or N,N'-dimethyl-N,N'-trimethyleneurea (1,3-dimethyl-3,4,5,6-tetrahydro-2(1H)-pyrimidinone (DMPU)); or an alcohol such as benzylalcohol (BA), ethanol, trifluoroethanol (2,2,2-trifluoroethanol), methanol, isopropanol, t-butanol or n-butanol; or a ketone such as methylethylketone (MEK) or methylisoamylketone (MIAK); or a nitro solvent such as nitrobenzene, nitromethane or nitroethane; or a nitrile solvent such as acetonitrile, propionitrile, butyronitrile or adiponitrile.

E22. A battery according to any of the preceding embodiments where the electrolyte composition contains ≤10 ppm water or ≤9, ≤8, ≤7, ≤6, ≤5 or ≤4 ppm water by weight, based on the total weight of the electrolyte composition.

E23. A battery according to any of the preceding embodiments where the electrolyte composition comprises an ionic liquid and a protic acid where the weight/weight ratio of the ionic liquids in total to the protic acids in total is for instance from about 99.5/0.5 to about 0.5/99.5, from about 99/1 to about 1/99, from about 95/5 to about 5/95, from about 90/10 to about 10/90, from about 80/20 to about 20/80, from about 70/30 to about 30/70 or from about 60/40 to about 40/60.

E24. A battery according to any of the preceding embodiments where the electrolyte composition comprises an ioinic liquid and an organic solvent where the weight/weight ratio of the ionic liquids in total to the organic solvents in total is for instance from about 99.5/0.5 to about 0.5/99.5, from about 99/1 to about 1/99, from about 95/5 to about 5/95, from about 90/10 to about 10/90, from about 80/20 to about 20/80, from about 70/30 to about 30/70 or from about 60/40 to about 40/60.

E25. A battery according to any of the preceding embodiments where the electrolyte composition contains one or more additives, for instance one or more additives selected from the group consisting of corrosion inhibitors, solid electrolyte interface (SEI) improvers, proton evolution improvers, self-discharge inhibitors, anti-gassing agents, viscosity adjusting agents, cathode protection agents, salt stabilizers, conductivity improvers and solvating agents.

E24. A battery according to any of the preceding embodiments where the electrolyte composition contains one or more additives selected from the group consisting of fluorinated oil, sodium stannate, sodium citrate or polyacrylic acids;

HF or KF, oxides or hydroxides of rare earths such as Y, metal porphines, for example Ni or Fe porphine, vinylene carbonate, vinylethylene carbonate, methylene ethylene carbonate or fluoro-ethylene carbonate;

polyglycols, polyglycol alkyl ethers, polyglycol alkyl phosphate esters or polysorbates such as polyethylene glycol (PEG), polypropylene glycol, polysorbate 20, polysorbate 40 or polysorbate 80 or a mixture of PEG 600 and polysorbate 20 or a mixture of PEG 600 and ZnO;

phosphate ester-based surfactants, propane sultone or fluoropropane sultone; and

DMSO;

for example at a level of from about 0.1% to about 15% by weight, based on the total weight of the electrolyte composition.

E25. A battery according to any of the preceding embodiments which exhibits a nominal open-circuit voltage of >1.2 V (volts) and up to about 6 V or from about 1.2 to about 6.0 V, from about 1.3 to about 6.0 V, from about 1.4 to about 6.0 V or from about 1.5 to about 6.0 V or about 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9 or about 6.0 V.

Below are more embodiments of the invention.

E1. An electrolyte composition comprising
  a) an ionic liquid and
  b) a protic acid and/or an organic solvent.

E2. An electrolyte composition according to embodiment 1 comprising a protic acid.

E3. An electrolyte composition according to embodiments 1 or 2 comprising an organic solvent.

E4. An electrolyte composition according to any of embodiments 1-3 where the ionic liquid contains an ammonium or phosphonium cation.

E5. An electrolyte composition according to any of the preceding embodiments where the ionic liquid contains a cation selected from the group consisting of formulae (a)-(h)

(a)

(b)

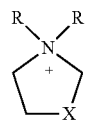
(c)

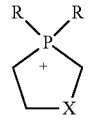
(d)

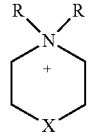
(e)

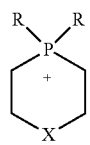
(f)

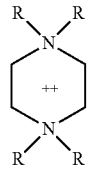
(g)

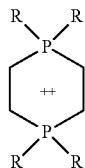
(h)

where each R is independently H, $C_1$-$C_{16}$alkyl or hydroxy$C_1$-$C_{16}$alkyl, for instance methyl, ethyl, hydroxyethyl or propyl and X is $CH_2$, O, S or NR where R is H or $C_1$-$C_{16}$alkyl, for instance H, methyl, ethyl or propyl.

E6. An electrolyte composition according to any of the preceding embodiments where the ionic liquid contains a cation selected from the group consisting of $NH_4^+$(ammonium), methylammonium, ethylammonium, dimethylammonium, diethylammonium, trimethylammonium ($NMe_3H^+$), triethylammonium, tributylammonium, diethylmethylammonium, hydroxyethylammonium, methoxymethylammonium, dibutylammonium, methylbutylammonium, anilinium, pyridinium, 2-methylpyridinium, imidazolium, 1-methylimidazolium, 1,2-dimethylimidazolium, imidazolinium, 1-ethylimidazolium, 1-(4-sulfobutyl)-3-methylimidazolium, 1-allylimidazolium, quinolinium, isoquinolinium, pyrrolinium, pyrrolininium or pyrrolidinium;

1-butyl-1-methylpyrrolidinium, tetramethylammonium, tetraethylammonium, tetra-n-butylammonium, n-butyl-tri-ethylammonium, benzyl-tri-methylammonium, tri-n-butylmethylammonium, benzyl-tri-ethylammonium, 1-methylpyridinium, 1-butyl-3,5-dimethylpyridinium, 1,2,4-trimethylpyrazolium, trimethylhydroxyethylammonium (choline), tri-(hydroxyethyl)methylammonium, dimethyl-di(polyoxyethylene)ammonium, 1,2,3-trimethylimidazolium, 1-butyl-3-methylimidazolium, 1-ethyl-2,3-dimethylimidazolium, 1-allyl-3-methylimidazolium, 1-hydroxyethyl-3-methylimidazolium, 1,3-dimethylimidazolium, 1-ethyl-1-methylpiperidinium, 4-ethyl-4-methylmorpholinium, 1-(cyanomethyl)-3-methylimidazolium, 1-(3-cyanopropyl)pyridinium, 1,3-bis(cyanomethyl)imidazolium, 1-hexyl-3-methylimidazolium or 1-ethyl-3-methylimidazolium; and methyltriphenylphosphonium, tetraphenylphosphonium, tetrabutylphosphonium, tributylmethylphosphonium, triethylmethylphosphonium, trihexyltetradecylphosphonium, triphenylpropylphosphonium or tetrakis(hydroxymethyl)phosphonium;

for instance, the cation is 1-ethyl-3-methylimidazolium, 1-hexyl-3-methylimidazolium, 1-butyl-1-methylpyrrolidinium or trihexyl(tetradecyl)phosphonium.

E7. An electrolyte composition according to any of the preceding embodiments where the ionic liquid contains an anion selected from the group consisting of carboxylates, imides, methides, nitrate, bifluoride, halides, borates, phosphates, phosphinates, phosphonates, sulfonates, sulfates, carbonates and aluminates.

E8. An electrolyte composition according to any of the preceding embodiments where the ionic liquid contains an anion selected from the group consisting of $[F_zB(C_mF_{2m+1})_{4-z}]^-$, $[F_yP(C_mF_{2m+1})_{6-y}]^-$, $[(C_mF_{2m+1})_2P(O)O]^-$, -continued $[(C_mF_{2m+1}P(O)O_2]^{2-}$, $[O-C(O)-C_mF_{2m+1}]^-$, $[O-S(O)_2-C_mF_{2m+1}]^-$, $[N(C(O)-C_mF_{2m+1})_2]^-$, $[N(S(O)_2-[(C_mF_{2m+1})_2]^-$, $[N(C(O)-C_mF_{2m+1})(S(O)_2-C_mF_{2m+1})]^-$, $[N(C(O)-C_mF_{2m+1})(C(O)F)]^-$, $[N(S(O)_2-C_mF_{2m+1})(S(O)_2F)]^-$, $[N(S(O)_2F)_2]^-$, $[C(C(O)-C_mF_{2m+1})_3]^-$, $[C(S(O)_2-C_mF_{2m+1})_3]^-$,

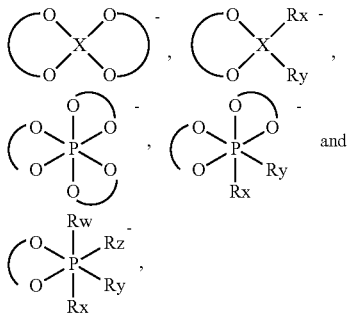 and where
y is an integer of 1 to 6,
m is an integer of 1 to 8, for instance 1 to 4,
z is an integer of 1 to 4,
X is B or Al and
$R_w$, $R_x$, $R_y$ and $R_z$ are independently halogen, $C_1$-$C_{20}$alkyl, $C_1$-$C_{20}$alkyl which is partly or fully fluorinated, $C_1$-$C_{20}$alkoxy, $C_1$-$C_{20}$alkoxy which is partly or fully fluorinated, $C_1$-$C_{20}$alkyl-COO or $C_1$-$C_{20}$alkyl-COO which is partly or fully fluorinated and
O^O is independently a bidentate group derived from the —OH groups of a 1,2- or 1,3-diol, a 1,2- or 1,3-dicarboxylic acid or from a 1,2- or 1,3-hydroxycarboxylic acid and
where any one $CF_2$ group may be replaced by O, $S(O)_2$, NR or $CH_2$.

E9. An electrolyte composition according to embodiment 7 where the ionic liquid contains an anion selected from the group consisting of $F_2P(C_2F_5)_4^-$, $F_3P(C_2F_5)_3^-$, $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$, $F_4P(C_4F_9)_2^-$, perfluoroalkylcarboxylate, perfluoroalkylsulfonate, bis(perfluoroalkylsulfonyl)imide, (perfluoroalkylsulfonyl)(perfluoroalkylcarboxyl)imide, tris(perfluoroalkylsulfonyl)methide, trifluoroacetate, trifluoromethanesulfonate (triflate), bis(trifluoromethylsulfonyl)imide, tris(trifluoromethylsulfonyl)methide, tetrafluoroborate or a spiro-oxo borate or spiro-oxo phosphate, for example bisoxalatoborate (BOB), difluorooxalatoborate (dFOB), di(trifluoroacetato)oxalatoborate (d(Ac)OB), trisoxalatophosphate, tetrafluorooxalatophosphate and di(trifluoroacetato)oxalatoaluminate.

E10. An electrolyte composition according to embodiment 7 where the ionic liquid contains a carboxylate anion of formula $RCOO^-$ where R is hydrogen or hydrocarbyl; such as formate, acetate (ethanoate), acrylate, propanoate, n-butanoate, i-butanoate, n-pentanoate, i-pentanoate, octanoate, decanoate, benzoate, salicylate, thiosalicylate, 2-, 3- or 4-nitrobenzoate; citrate, oxalate, tartrate, glycolate, gluconate, malate, mandelate, a carboxylate of nitrilotriacetic acid, a carboxylate of N-(2-hydroxyethyl)-ethylenediaminetriacetic acid, a carboxylate of ethylenediaminetetraacetic acid, a carboxylate of diethylenetriaminepentaacetic acid or a haloalkylcarboxylate such as fluoroacetate, difluoroacetate, trifluoroacetate, chloroacetate, dichloroacetate or trichloroacetate.

E11. An electrolyte composition according to embodiment 7 where the ionic liquid contains
an imide anion such as dicyanamide, $N(SO_2F)_2^-$ ((bisfluorosulfonyl)imide), a bis(perfluoroalkylsulfonyl)imide such as $[N(SO_2CF_3)_2]^-$ (bistriflimide), bis(pentafluoroethylsulfonyl)imide or $N(CF_3SO_2)(CF_3(CF_2)_3SO_2)^-$ or a (perfluoroalkylsulfonyl)(perfluoroalkylcarboxyl)imide; or
a methide such as a tris(perfluoroalkylsulfonyl)methide, for example tris(trifluoromethylsulfonyl)methide, $C(CF_3SO_2)_3^-$; or
bifluoride ($HF_2^-$); or
chloride, bromide, iodide or fluoride; or
a borate such as orthoborate, tetrahydroxyborate, tetraborate, tetraphenylborate, $[B(3,5-(CF_3)_2C_6H_3)_4]^-$ (BARF), $B(O_2O_4)_2^-$(bis(oxalato)borate) (BOB), difluoro(oxalato)borate (dFOB), di(trifluoroacetato)oxalatoborate (D(Ac)OB), $B(C_6F_5)_4^-$ or $BF_4^-$(tetrafluoroborate); or
a phosphate such as dihydrogen phosphate, hydrogen phosphate, alkyl phosphate, dialkyl phosphate, phosphate, $PF_6^-$ (hexafluorophosphate), $HPO_3F^-$(fluorohydrogen phosphate), trisoxalatophosphate (TOP), tetrafluorooxalatophosphate (TFOP) or a fluoro(perfluoroalkyl)phosphate such as $F_2P(C_2F_5)_4^-$, $F_3P(C_2F_5)_3^-$(tris(pentafluoroethyl)trifluorophosphate or FAP), $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$ or $F_4P(C_4F_9)_2^-$; or
a sulfonate such as an alkylsulfonate, arylsulfonate or perfluoroalkylsulfonate, for instance trifluoromethanesulfonate (triflate), p-toluenesulfonate (tosylate) or methanesulfonate (mesylate); or
a sulfate such as hydrogensulfate, sulfate, thiosulfate or an alkylsulfate such as methylsulfate or ethylsulfate; or
a carbonate anion such as carbonate, hydrogencarbonate or an alkylcarbonate such as methylcarbonate, ethylcarbonate or butylcarbonate; or
an aluminate such as $Al(OC(CF_3)_3)_4^-$, di(trifluoroacetato)oxalatoaluminate (d(Ac)OAl), tetrachloroaluminate, tetrafluoroaluminate, tetraiodoaluminate or tetrabromoaluminate.

E12. An electrolyte composition according to any of embodiments 1-3 where the ionic liquid is selected from the group consisting of diethylmethylammonium trifluoromethanesulfonate (DEMA TfO), ethylammonium nitrate, triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium hydrogensulfate, 1-methylimidazolium chloride, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonium dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride and dimethylammonium bifluoride.

E13. An electrolyte composition according to any of embodiments 1-3 where the ionic liquid is selected from the group consisting of 1-ethyl-3-methylimidazolium trifluoromethanesulfonate (EMIM TfO), 1-ethyl-3-methylimidazolium tetrafluoroborate (EMIM $BF_4$), 1-ethyl-3-methylimidazolium bis(trifluoromethylsulfonyl)imide (EMIM TFSI), 1-ethyl-3-methylimidazolium acetate (EMIM Ac), 1-butyl-3-methylimidazolium trifluoromethanesulfonate (BMIM TfO), 1-butyl-3-methylimidazolium acetate (BMIM Ac), 1-butyl-3-methylimidazolium bis(trifluoromethylsulfonyl)imide (BMIM TFSI), tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogencarbonate, 1-butyl-3-methylimidazolium hydrogensulfate, 1-butyl-3-methylimidazolium chloride, 1,2,3-trimethylimidazolium methylsulfate, tris-(hydroxyethyl)methylammonium methylsulfate, 1,2,4-trimethylpyrazolium methylsulfate, 1,3-dimethylimdiazolium hydrogencarbonate, 1-ethyl-3-methylimidazolium hydrogencarbonate, 1-ethyl-3-methylimidazolium chloride, 1-ethyl-3-methylimidazolium tetrachloroaluminate, 1-ethyl-3-methylimidazolium thiocyanate, 1-ethyl-3-methylimidazolium methanesulfonate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium hexafluorophosphate, 1-butyl-3,5-dimethylpyridinium bromide, 1-ethyl-3-methylimidazolium bis(pentafluoroethylsulfonyl)imide, 1-ethyl-2,3-dimethylimidazolium methylcarbonate, carboxymethyl-tributylphosphonium bis(trifluoromethylsulfonyl)imide, N-carboxyethyl-methylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis(trifluromethylsulfonyl)imide, tetrabutylphosphonium methanesulfonate, triethylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylphosphonium dibutylphosphate, triethylmethylphosphonium dibutylphosphate, tetrabutylphosphonium tetrafluoroborate, tetrabutylphosphonium p-toluenesulfonate, tributylmethylphosphonium methylcarbonate, 1-ethyl-3-methylimidazolium hydrogencarbonate, tributylmethylammonium methylcarbonate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl)pyridinium chloride, 1-(3-cyanopropyl)pyridinium bis(trifluoromethylsulfonyl)imide, 1,3-bis(cyanomethyl)imidazolium chloride, 1,3-bis(cyanomethyl)imidazolium bis(trifluoromethylsulfonyl)imide, 1,3-bis(cyanopropyl)imidazolium chloride, 1,3-bis(3-cyanopropyl)imidazolium bis(trifluoromethylsulfonyl)imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3-methylimidazolium chloride, tributylmethylphosphonium methylsulfate, triethylmethylphosphonium dibutylphosphate, trihexyltetradecylphosphonium bis(trifluoromethylsulfonyl)imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate and 3-(triphenylphosphonio)propane-1-sulfonic acid tosylate.

E14. An electrolyte composition according to any of the preceding embodiments where the electrolyte composition comprises a protic acid such as hydrochloric acid, nitric acid, phosphoric acid, sulfuric acid, boric acid, hydrofluoric acid, hydrobromic acid, hydroiodic acid, perchloric acid or periodic acid; or a bisulfate such as sodium bisulfate, potassium bisulfate or ammonium bisulfate; or $HAsF_6$, $HBF_4$, $H(OEt_2)BF_4$, $HPF_6$, $H[N(SO_2CF_3)_2]$ or $H[N(SO_2CF_2CF_3)_2]$.

E15. An electrolyte composition according to any of the preceding embodiments comprising a carboxylic protic acid of formula RCOOH where R is hydrogen or hydrocarbyl.

E16. An electrolyte composition according to any of the preceding embodiments comprising a protic sulfonic acid of formula $RSO_3H$ where R is alkyl or aryl or alkyl or aryl substituted by one to three halogens, such as p-toluenesulfonic acid, phenylsulfonic acid, methanesulfonic acid or trifluoromethanesulfonic acid.

E17. An electrolyte composition according to any of the preceding embodiments comprising a protic acid which is an oxonium ion associated with a highly non-coordinating ion such as Brookhart's acid (BARF acid), $[H(OEt_2)_2][B[3,5-(CF_3)_2C_6H_3]_4]$, $[H(OEt_2)_2][B(C_6F_5)_4]$(oxonium acid) or $[H(OEt_2)_2][Al(OC(CF_3)_3)_4]$.

E18. An electrolyte composition according to any of the preceding embodiments comprising an organic solvent, for instance an organic solvent selected from the group consisting of organic carbonates, ethers, glymes, ortho esters, polyalkylene glycols, esters, lactones, glycols, formates, sulfones, sulfoxides, amides, alcohols, ketones, nitro solvents, nitrile solvents and combinations thereof.

E19. An electrolyte composition according to any of the preceding embodiments comprising an organic solvent such as an organic carbonate, for example a cyclic or acyclic organic carbonate such as ethylene carbonate (EC), propylene carbonate (PC), trimethylene carbonate, 1,2-butylene carbonate (BC), dimethyl carbonate (DMC), diethyl carbonate (DEC), ethylmethyl carbonate (EMC), vinylene carbonate, difluoroethylene carbonate or monofluoroethylene carbonate; or an ether or glyme such as dimethoxymethane (DMM), diethoxymethane, 1,2-dimethoxyethane (DME or ethyleneglycol dimethylether or glyme), diglyme, triglyme, tetraglyme, ethyleneglycol diethylether (DEE), ethyleneglycol dibutylether, diethyleneglycol diethylether, tetrahydrofuran (THF), 2-methyltetrahydrofuran (2-MeTHF), 1,3-dioxane, 1,3-dioxolane (DIOX), 4-methyl-1,3-dioxolane (4-MeDIOX), 2-methyl-1,3-dioxolane (2-MeDIOX), 1,4-dioxane, dimethylether, ethylmethylether, diethylether, di-n-butylether, di-t-butylether, di-isopropylether, methyl-t-butylether, ethyl-t-butylether or t-amyl-methylether; or an ortho ester such as trimethoxymethane, triethoxymethane, 1,4-dimethyl-3,5,8-trioxabicyclo[2.2.2]octane or 4-ethyl-1-methyl-3,5,8-trioxabicyclo[2.2.2]octane; or a polyalkylene glycol, that is a homo- or cooligomer or homo- or copolymer of $C_1$-$C_4$alkylene glycols, such as polyethylene glycol (PEG) or monomethyl, dimethyl or diethyl (end-capped) polyethylene glycol with weight average molecular weights (Mw) for example from about 200 to about 1200 g/mol, from about 200 to about 1000 g/mol, from about 200 to about 900 g/mol, from about 200 to about 700 g/mol or from about 200 to about 500 g/mol, for example oligomers of 4 monomers or more, for instance tetraethylene glycol, fluorinated tetraethylene glycol or tetrapropylene glycol, for instance PEG 200, PEG 300, PEG 400, PEG 500, PEG 600, PEG 700, PEG 800, PEG 900 or PEG 1000; or an ester or lactone such as γ-butyrolactone (GBL), γ-valerolactone, δ-valerolactone, ethyl acetate (EA), 2-methoxyethyl acetate, 2-ethoxyethyl acetate, 2-butoxyethyl acetate, 2-(2-butoxyethoxy)ethyl acetate (diethylene glycol butyl ether acetate, DBA), ethylene glycol diacetate (EGDA), 3-ethoxy ethyl propionate (EEP), methyl butyrate (MB), n-amyl acetate (NAAC), propylene glycol methyl ether acetate (PMA), ethyl butryate (EB), diethyl malonate or dimethyl malonate; or a dibasic ester mixture such as methyl esters of adipic, glutaric or succinic acids; or a glycol such as ethylene glycol, propylene glycol, 2-methoxyethanol, 2-ethoxyethanol, 2-propoxyethanol, 2-isopropoxyethanol, 2-butoxyethanol (ethylene glycol butyl ether, EB), 2-phenoxyethanol, 2-benzyloxyethanol, 2-(2-methoxyethoxy)ethanol, 2-(2-ethoxyethoxy)ethanol, 2-(2-butoxyethoxy)ethanol (diethylene glycol butyl ether, DB), propylene glycol butyl ether (PB), propylene glycol methyl ether (PM), triethylene glycol (TEG), dipropylene glycol methyl ether (DPM), diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether or fluorinated diethylene glycol butyl ether; or a formate such as methyl formate, ethyl formate, isobutyl formate or tert-butyl formate; or a sulfone or sulfoxide such as methylsulfonylmethane (MSM or dimethylsulfone), ethylmethylsulfone, sulfolane or dimethylsulfoxide (DMSO); or an amide such as dimethylformamide (DMF), dimethylacetamide (DMA), N-methylpyrrolidone (NMP), 2-pyrrolidone, 1,3-dimethyl-2-imidazolidinone (DMI), hexamethylphosphoramide (HMPA) or N,N'-dimethyl-N,N'-trimethyleneurea (1,3-dimethyl-3,4,5,6-tetrahydro-2(1H)-pyrimidinone (DMPU)); or an alcohol such as benzylalcohol (BA), ethanol, trifluoroethanol (2,2,2-trifluoroethanol), methanol, isopropanol, t-butanol or n-butanol; or a ketone such as methylethylketone (MEK) or methylisoamylketone (MIAK); or a nitro solvent such as nitrobenzene, nitromethane or nitroethane; or a nitrile solvent such as acetonitrile, propionitrile, butyronitrile or adiponitrile.

E20. An electrolyte composition according to any of the preceding embodiments which contains ≤10 ppm water or ≤9, ≤8, ≤7, ≤6, ≤5 or ≤4 ppm water by weight, based on the total weight of the electrolyte composition.

E21. An electrolyte composition according to any of the preceding embodiments comprising a protic acid where the weight/weight ratio of the ionic liquids in total to the protic acids in total is for instance from about 99.5/0.5 to about 0.5/99.5, from about 99/1 to about 1/99, from about 95/5 to about 5/95, from about 90/10 to about 10/90, from about 80/20 to about 20/80, from about 70/30 to about 30/70 or from about 60/40 to about 40/60.

E22. An electrolyte composition according to any of the preceding embodiments comprising an organic solvent where the weight/weight ratio of the ionic liquids in total to the organic solvents in total is for instance from about 99.5/0.5 to about 0.5/99.5, from about 99/1 to about 1/99, from about 95/5 to about 5/95, from about 90/10 to about 10/90, from about 80/20 to about 20/80, from about 70/30 to about 30/70 or from about 60/40 to about 40/60.

E23. An electrolyte composition according to any of the preceding embodiments which contains one or more additives, for instance one or more additives selected from the group consisting of corrosion inhibitors, solid electrolyte interface (SEI) improvers, proton evolution improvers, self-discharge inhibitors, anti-gassing agents, viscosity adjusting agents, cathode protection agents, salt stabilizers, conductivity improvers and solvating agents.

E24. An electrolyte composition according to any of the preceding embodiments which contains one or more additives selected from the group consisting of fluorinated oil, sodium stannate, sodium citrate or polyacrylic acids;

HF or KF, oxides or hydroxides of rare earths such as Y, metal porphines, for example Ni or Fe porphine, vinylene carbonate, vinylethylene carbonate, methylene ethylene carbonate or fluoro-ethylene carbonate;

polyglycols, polyglycol alkyl ethers, polyglycol alkyl phosphate esters or polysorbates such as polyethylene glycol (PEG), polypropylene glycol, polysorbate 20, polysorbate 40 or polysorbate 80 or a mixture of PEG 600 and polysorbate 20 or a mixture of PEG 600 and ZnO;

phosphate ester-based surfactants, propane sultone or fluoropropane sultone; and

DMSO;

for example at a level of from about 0.1% to about 15% by weight, based on the total weight of the electrolyte composition.

Following are more embodiments of the invention.

E1. A metal hydride battery (cell) comprising at least one negative electrode, at least one positive electrode, a casing having said electrodes positioned therein and an electrolyte composition, which battery exhibits a nominal open-circuit voltage of >1.2 V (volts) and up to about 6 V or from about 1.2 to about 6.0 V, from about 1.3 to about 6.0 V, from about 1.4 to about 6.0 V or from about 1.5 to about 6.0 V or about 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9 or about 6.0 V.

E2. A battery according to embodiment 1 where the electrolyte composition comprises an ionic liquid; for instance where the ionic liquid contains an ammonium or phosphonium cation.

E3. A battery according to embodiments 1 or 2 where the electrolyte composition comprises a protic acid.

E4. A battery according to any of embodiments 1 to 3 where the electrolyte composition comprises an organic solvent.

E5. A battery according to any of the preceding embodiments where the electrolyte composition comprises an ionic liquid which contains a cation selected from the group consisting of formulae (a)-(h)

 (a)

 (b)

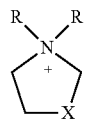 (c)

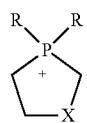 (d)

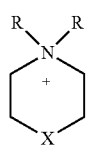 (e)

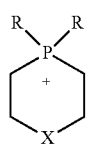 (f)

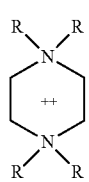 (g)

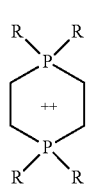 (h)

where
each R is independently H, $C_1$-$C_{16}$alkyl or hydroxy$C_1$-$C_{16}$alkyl, for instance methyl, ethyl, hydroxyethyl or propyl and
X is $CH_2$, O, S or NR where R is H or $C_1$-$C_{16}$alkyl, for instance H, methyl, ethyl or propyl.

E6. A battery according to any of the preceding embodiments where the electrolyte composition comprises ionic liquid which contains a cation selected from the group consisting of $NH_4^+$(ammonium), methylammonium, ethylammonium, dimethylammonium, diethylammonium, trimethylammonium ($NMe_3H^+$), triethylammonium, tributylammonium, diethylmethylammonium, hydroxyethylammonium, methoxymethylammonium, dibutylammonium, methylbutylammonium, anilinium, pyridinium, 2-methylpyridinium, imidazolium, 1-methylimidazolium, 1,2-dimethylimidazolium, imidazolinium, 1-ethylimidazolium, 1-(4-sulfobutyl)-3-methylimidazolium, 1-allylimidazolium, quinolinium, isoquinolinium, pyrrolinium, pyrrolininium or pyrrolidinium;

1-butyl-1-methylpyrrolidinium, tetramethylammonium, tetraethylammonium, tetra-n-butylammonium, n-butyl-tri-ethylammonium, benzyl-tri-methylammonium, tri-n-butylmethylammonium, benzyl-tri-ethylammonium, 1-methylpyridinium, 1-butyl-3,5-dimethylpyridinium, 1,2,4-trimethylpyrazolium, trimethylhydroxyethylammonium (choline), tri-(hydroxyethyl)methylammonium, dimethyl-di(polyoxyethylene)ammonium, 1,2,3-trimethylimidazolium, 1-butyl-3-methylimidazolium, 1-ethyl-2,3-dimethylimidazolium, 1-allyl-3-methylimidazolium, 1-hydroxyethyl-3-methylimidazolium, 1,3-dimethylimidazolium, 1-ethyl-1-methylpiperidinium, 4-ethyl-4-methylmorpholinium, 1-(cyanomethyl)-3-methylimidazolium, 1-(3-cyanopropyl)pyridinium, 1,3-bis(cyanomethyl)imidazolium, 1-hexyl-3-methylimidazolium or 1-ethyl-3-methylimidazolium; and methyltriphenylphosphonium, tetraphenylphosphonium, tetrabutylphosphonium, tributylmethylphosphonium, triethylmethylphosphonium, trihexyltetradecylphosphonium, triphenylpropylphosphonium or tetrakis(hydroxymethyl)phosphonium;

for instance, the cation is 1-ethyl-3-methylimidazolium, 1-hexyl-3-methylimidazolium, 1-butyl-1-methylpyrrolidinium or trihexyl(tetradecyl)phosphonium.

E7. A battery according to any of the preceding embodiments where the electrolyte compositon comprises an ionic liquid which contains an anion selected from the group consisting of carboxylates, imides, methides, nitrate, bifluoride, halides, borates, phosphates, phosphinates, phosphonates, sulfonates, sulfates, carbonates and aluminates.

E8. A battery according to embodiment 7 where the ionic liquid contains an anion selected from the group consisting of

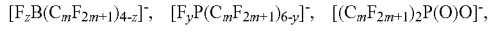

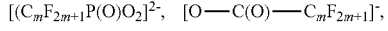

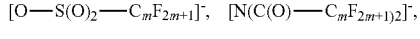

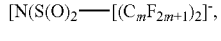

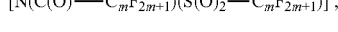

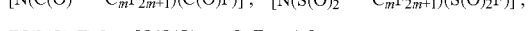

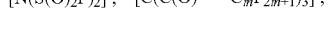

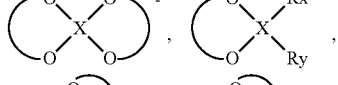

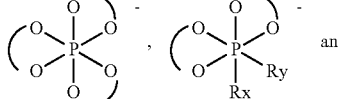

 and

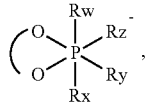

where
y is an integer of 1 to 6,
m is an integer of 1 to 8, for instance 1 to 4,
z is an integer of 1 to 4,
X is B or Al and
$R_w$, $R_x$, $R_y$, and $R_z$ are independently halogen, $C_1$-$C_{20}$alkyl, $C_1$-$C_{20}$alkyl which is partly or fully fluorinated, $C_1$-$C_{20}$alkoxy, $C_1$-$C_{20}$alkoxy which is partly or fully fluorinated, $C_1$-$C_{20}$alkyl-COO or $C_1$-$C_{20}$alkyl-COO which is partly or fully fluorinated and
O⌒O is independently a bidentate group derived from the —OH groups of a 1,2- or 1,3-diol, a 1,2- or 1,3-dicarboxylic acid or from a 1,2- or 1,3-hydroxycarboxylic acid and where any one $CF_2$ group may be replaced by O, $S(O)_2$, NR or $CH_2$.

E9. A battery according to embodiment 7 where the anion is $F_2P(C_2F_5)_4^-$, $F_3P(C_2F_5)_3^-$, $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$, $F_4P(C_4F_9)_2^-$, perfluoroalkylcarboxylate, perfluoroalkylsulfonate, bis(perfluoroalkylsulfonyl)imide, (perfluoroalkylsulfonyl)(perfluoroalkylcarboxyl)imide, tris(perfluoroalkylsulfonyl)methide, trifluoroacetate, trifluoromethanesulfonate (triflate), bis(trifluoromethylsulfonyl)imide, tris(trifluoromethylsulfonyl)methide, tetrafluoroborate or a spiro-oxo borate or spiro-oxo phosphate, for example bisoxalatoborate (BOB), difluorooxalatoborate (dFOB), di(trifluoroacetato)oxalatoborate (d(Ac)OB), trisoxalatophosphate, tetrafluorooxalatophosphate or di(trifluoroacetato)oxalatoaluminate.

E10. A battery according to embodiment 7 where the ionic liquid contains a carboxylate anion of formula $RCOO^-$ where R is hydrogen or hydrocarbyl; such as formate, acetate (ethanoate), acrylate, propanoate, n-butanoate, i-butanoate, n-pentanoate, i-pentanoate, octanoate, decanoate, benzoate, salicylate, thiosalicylate, 2-, 3- or 4-nitrobenzoate; citrate, oxalate, tartrate, glycolate, gluconate, malate, mandelate, a carboxylate of nitrilotriacetic acid, a carboxylate of N-(2-hydroxyethyl)-ethylenediaminetriacetic acid, a carboxylate of ethylenediaminetetraacetic acid, a carboxylate of diethylenetriaminepentaacetic acid or a haloalkylcarboxylate such as fluoroacetate, difluoroacetate, trifluoroacetate, chloroacetate, dichloroacetate or trichloroacetate.

E11. A battery according to embodiment 7 where the ionic liquid contains
an imide anion such as dicyanamide, $N(SO_2F)_2^-$((bisfluorosulfonyl)imide), a bis(perfluoroalkylsulfonyl)imide such as $[N(SO_2CF_3)_2]^-$(bistriflimide), bis(pentafluoroethylsulfonyl)imide or $N(CF_3SO_2)(CF_3(CF_2)_3SO_2)^-$ or a (perfluoroalkylsulfonyl)(perfluoroalkylcarboxyl)imide; or
a methide such as a tris(perfluoroalkylsulfonyl)methide, for example tris(trifluoromethylsulfonyl)methide, $C(CF_3SO_2)_3^-$; or
bifluoride ($HF_2^-$); or
chloride, bromide, iodide or fluoride; or
a borate such as orthoborate, tetrahydroxyborate, tetraborate, tetraphenylborate, $[B(3,5-(CF_3)_2C_6H_3)_4]^-$ (BARF), $B(C_2O_4)_2^-$(bis(oxalato)borate) (BOB), difluoro(oxalato)borate (dFOB), di(trifluoroacetato)oxalatoborate (D(Ac)OB), $B(C_6F_5)_4^-$ or $BF_4^-$(tetrafluoroborate); or a phosphate such as dihydrogen phosphate, hydrogen phosphate, alkyl phosphate, dialkyl phosphate, phosphate, $PF_6^-$ (hexafluorophosphate), $HPO_3F^-$(fluorohydrogen phosphate), trisoxalatophosphate (TOP), tetrafluorooxalatophosphate (TFOP) or a fluoro(perfluoroalkyl)phosphate such as $F_2P(C_2F_5)_4^-$, $F_3P(C_2F_5)_3^-$(tris(pentafluoroethyl)trifluorophosphate or FAP), $F_4P(C_2F_5)_2^-$, $F_2P(C_3F_7)_4^-$, $F_3P(C_3F_7)_3^-$, $F_4P(C_3F_7)_2^-$, $F_2P(C_4F_9)_4^-$, $F_3P(C_4F_9)_3^-$ or $F_4P(C_4F_9)_2^-$; or
a sulfonate such as an alkylsulfonate, arylsulfonate or perfluoroalkylsulfonate, for instance trifluoromethanesulfonate (triflate), p-toluenesulfonate (tosylate) or methanesulfonate (mesylate); or
a sulfate such as hydrogensulfate, sulfate, thiosulfate or an alkylsulfate such as methylsulfate or ethylsulfate; or
a carbonate anion such as carbonate, hydrogencarbonate or an alkylcarbonate such as methylcarbonate, ethylcarbonate or butylcarbonate; or
an aluminate such as $Al(OC(CF_3)_3)_4^-$, di(trifluoroacetato) oxalatoaluminate (d(Ac)OAl), tetrachloroaluminate, tetrafluoroaluminate, tetraiodoaluminate or tetrabromoaluminate.

E12. A battery according to any of embodiments 1 to 4 where the electrolyte composition comprises an ionic liquid selected from the group consisting of diethylmethylammonium trifluoromethanesulfonate (DEMA TfO), ethylammonium nitrate, triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium hydrogensulfate, 1-methylimidazolium chloride, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonium dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride and dimethylammonium bifluoride.

E13. A battery according to any of embodiments 1 to 4 where the electrolyte composition comprises an ionic liquid selected from the group consisting of 1-ethyl-3-methylimidazolium trifluoromethanesulfonate (EMIM TfO), 1-ethyl-3-methylimidazolium tetrafluoroborate (EMIM BF$_4$), 1-ethyl-3-methylimidazolium bis(trifluoromethylsulfonyl) imide (EMIM TFSI), 1-ethyl-3-methylimidazolium acetate (EMIM Ac), 1-butyl-3-methylimidazolium trifluoromethanesulfonate (BMIM TfO), 1-butyl-3-methylimidazolium acetate (BMIM Ac), 1-butyl-3-methylimidazolium bis(trifluoromethylsulfonyl)imide (BMIM TFSI), tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogencarbonate, 1-butyl-3-methylimidazolium hydrogensulfate, 1-butyl-3-methylimidazolium chloride, 1,2,3-trimethylimidazolium methylsulfate, tris-(hydroxyethyl)methylammonium methylsulfate, 1,2,4-trimethylpyrazolium methylsulfate, 1,3-dimethylimdiazolium hydrogencarbonate, 1-ethyl-3-methylimidazolium hydrogencarbonate, 1-ethyl-3-methylimidazolium chloride, 1-ethyl-3-methylimidazolium tetrachloroaluminate, 1-ethyl-3-methylimidazolium thiocyanate, 1-ethyl-3-methylimidazolium methanesulfonate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium hexafluorophosphate, 1-butyl-3,5-dimethylpyridinium bromide, 1-ethyl-3-methylimidazolium bis(pentafluoroethylsulfonyl)imide, 1-ethyl-2,3-dimethylimidazolium methylcarbonate, carboxymethyl-tributylphosphonium bis(trifluoromethylsulfonyl)imide, N-carboxyethyl-methylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis(trifluromethylsulfonyl)imide, tetrabutylphosphonium methanesulfonate, triethylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylphosphonium dibutylphosphate, triethylmethylphosphonium dibutylphosphate, tetrabutylphosphonium tetrafluoroborate, tetrabutylphosphonium p-toluenesulfonate, tributylmethylphosphonium methylcarbonate, 1-ethyl-3-methylimidazolium hydrogencarbonate, tributylmethylammonium methylcarbonate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl)pyridinium chloride, 1-(3-cyanopropyl) pyridinium bis(trifluoromethylsulfonyl)imide, 1,3-bis(cyanomethyl)imidazolium chloride, 1,3-bis(cyanomethyl) imidazolium bis(trifluoromethylsulfonyl)imide, 1,3-bis(cyanopropyl)imidazolium chloride, 1,3-bis(3-cyanopropyl) imidazolium bis(trifluoromethylsulfonyl)imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3-methylimidazolium chloride, tributylmethylphosphonium methylsulfate, triethylmethylphosphonium dibutylphosphate, trihexyltetradecylphosphonium bis(trifluoromethylsulfonyl)imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate and 3-(triphenylphosphonio)propane-1-sulfonic acid tosylate.

E14. A battery according to any of the preceding embodiments where the electrolyte composition comprises a protic acid such as hydrochloric acid, nitric acid, phosphoric acid, sulfuric acid, boric acid, hydrofluoric acid, hydrobromic acid, hydroiodic acid, perchloric acid or periodic acid; or a bisulfate such as sodium bisulfate, potassium bisulfate or ammonium bisulfate; or HAsF$_6$, HBF$_4$, H(OEt$_2$)BF$_4$, HPF$_6$, H[N(SO$_2$CF$_3$)$_2$] or H[N(SO$_2$CF$_2$CF$_3$)$_2$].

E15. A battery according to any of the preceding embodiments where the electrolyte composition comprises an organic protic acid such as a carboxylic acid of formula RCOOH where R is hydrogen or hydrocarbyl, for example formic acid, acetic acid, acrylic acid, fluoroacetic acid, difluoroacetic acid, trifluoroacetic acid, chloroacetic acid, dichloroacetic acid, trichloroacetic acid, propanoic acid, butyric acid, 3-methylbutanoic acid, valeric acid, hexanoic acid, heptanoic acid, caprylic acid, nonanoic acid, benzoic acid, salicylic acid, 2-, 3- or 4-nitrobenzoic acid; citric acid, oxalic acid, tartaric acid, glycolic acid, gluconic acid, malic acid, mandelic acid, nitrilotriacetic acid, N-(2-hydroxyethyl)-ethylenediaminetriacetic acid, ethylenediaminetetraacetic acid or diethyleneaminepentaacetic acid.

E16. A battery according to any of the preceding embodiments where the electrolyte composition comprises a protic sulfonic acid of formula RSO$_3$H where R is alkyl or aryl or alkyl or aryl substituted by one to three halogens, such as p-toluenesulfonic acid, phenylsulfonic acid, methanesulfonic acid or trifluoromethanesulfonic acid.

E17. A battery according to any of the preceding embodiments where the electrolyte composition comprises a protic acid which is an oxonium ion associated with a highly non-coordinating ion such as Brookhart's acid (BARF acid), [H(OEt$_2$)$_2$][B[3,5-(CF$_3$)$_2$C$_6$H$_3$]$_4$], [H(OEt$_2$)$_2$][B(C$_6$F$_5$)$_4$] (oxonium acid) or [H(OEt$_2$)$_2$][Al(OC(CF$_3$)$_3$)$_4$].

E18. A battery according to any of the preceding embodiments where the electrolyte composition comprises an organic solvent, for instance an organic solvent selected from the group consisting of organic carbonates, ethers, glymes, ortho esters, polyalkylene glycols, esters, lactones, glycols, formates, sulfones, sulfoxides, amides, alcohols, ketones, nitro solvents, nitrile solvents and combinations thereof.

E19. A battery according to any of the preceding embodiments where the electrolyte composition comprises an organic solvent such as an organic carbonate, for example a cyclic or acyclic organic carbonate such as ethylene carbonate (EC), propylene carbonate (PC), trimethylene carbonate, 1,2-butylene carbonate (BC), dimethyl carbonate (DMC), diethyl carbonate (DEC), ethylmethyl carbonate (EMC), vinylene carbonate, difluoroethylene carbonate or monofluoroethylene carbonate; or an ether or glyme such as dimethoxymethane (DMM), diethoxymethane, 1,2-dimethoxyethane (DME or ethyleneglycol dimethylether or glyme), diglyme, triglyme, tetraglyme, ethyleneglycol diethylether (DEE), ethyleneglycol dibutylether, diethyleneglycol diethylether, tetrahydrofuran (THF), 2-methyltetrahydrofuran (2-MeTHF), 1,3-dioxane, 1,3-dioxolane (DIOX), 4-methyl-1,3-dioxolane (4-MeDIOX), 2-methyl-1,3-dioxolane (2-MeDIOX), 1,4-dioxane, dimethylether, ethylmethylether, diethylether, di-n-butylether, di-t-butylether, di-isopropylether, methyl-t-butylether, ethyl-t-butylether or t-amyl-methylether; or an ortho ester such as trimethoxymethane, triethoxymethane, 1,4-dimethyl-3,5,8-trioxabicyclo[2.2.2]octane or 4-ethyl-1-methyl-3,5,8-trioxabicyclo[2.2.2]octane; or a polyalkylene glycol, that is a homo- or cooligomer or homo- or copolymer of $C_1$-$C_4$alkylene glycols, such as polyethylene glycol (PEG) or monomethyl, dimethyl or diethyl (end-capped) polyethylene glycol with weight average molecular weights (Mw) for example from about 200 to about 1200 g/mol, from about 200 to about 1000 g/mol, from about 200 to about 900 g/mol, from about 200 to about 700 g/mol or from about 200 to about 500 g/mol, for example oligomers of 4 monomers or more, for instance tetraethylene glycol, fluorinated tetraethylene glycol or tetrapropylene glycol, for instance PEG 200, PEG 300, PEG 400, PEG 500, PEG 600, PEG 700, PEG 800, PEG 900 or PEG 1000; or an ester or lactone such as γ-butyrolactone (GBL), γ-valerolactone, δ-valerolactone, ethyl acetate (EA), 2-methoxyethyl acetate, 2-ethoxyethyl acetate, 2-butoxyethyl acetate, 2-(2-butoxyethoxy)ethyl acetate (diethylene glycol butyl ether acetate, DBA), ethylene glycol diacetate (EGDA), 3-ethoxy ethyl propionate (EEP), methyl butyrate (MB), n-amyl acetate (NAAC), propylene glycol methyl ether acetate (PMA), ethyl butryate (EB), diethyl malonate or dimethyl malonate; or a dibasic ester mixture such as methyl esters of adipic, glutaric or succinic acids; or a glycol such as ethylene glycol, propylene glycol, 2-methoxyethanol, 2-ethoxyethanol, 2-propoxyethanol, 2-isopropoxyethanol, 2-butoxyethanol (ethylene glycol butyl ether, EB), 2-phenoxyethanol, 2-benzyloxyethanol, 2-(2-methoxyethoxy)ethanol, 2-(2-ethoxyethoxy)ethanol, 2-(2-butoxyethoxy)ethanol (diethylene glycol butyl ether, DB), propylene glycol butyl ether (PB), propylene glycol methyl ether (PM), triethylene glycol (TEG), dipropylene glycol methyl ether (DPM), diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether or fluorinated diethylene glycol butyl ether; or a formate such as methyl formate, ethyl formate, isobutyl formate or tert-butyl formate; or a sulfone or sulfoxide such as methylsulfonylmethane (MSM or dimethylsulfone), ethylmethylsulfone, sulfolane or dimethylsulfoxide (DMSO); or an amide such as dimethylformamide (DMF), dimethylacetamide (DMA), N-methylpyrrolidone (NMP), 2-pyrrolidone, 1,3-dimethyl-2-imidazolidinone (DMI), hexamethylphosphoramide (HMPA) or N,N'-dimethyl-N,N'-trimethyleneurea (1,3-dimethyl-3,4,5,6-tetrahydro-2(1H)-pyrimidinone (DMPU)); or an alcohol such as benzylalcohol (BA), ethanol, trifluoroethanol (2,2,2-trifluoroethanol), methanol, isopropanol, t-butanol or n-butanol; or a ketone such as methylethylketone (MEK) or methylisoamylketone (MIAK); or a nitro solvent such as nitrobenzene, nitromethane or nitroethane; or a nitrile solvent such as acetonitrile, propionitrile, butyronitrile or adiponitrile.

E20. A battery according to any of the preceding embodiments where the electrolyte composition contains ≤10 ppm water or ≤9, ≤8, ≤7, ≤6, ≤5 or ≤4 ppm water by weight, based on the total weight of the electrolyte composition.

E21. A battery according to any of the preceding embodiments where the electrolyte composition comprises an ionic liquid and a protic acid where the weight/weight ratio of the ionic liquids in total to the protic acids in total is for instance from about 99.5/0.5 to about 0.5/99.5, from about 99/1 to about 1/99, from about 95/5 to about 5/95, from about 90/10 to about 10/90, from about 80/20 to about 20/80, from about 70/30 to about 30/70 or from about 60/40 to about 40/60.

E22. A battery according to any of the preceding embodiments where the electrolyte composition comprises an ionic liquid and an organic solvent where the weight/weight ratio of the ionic liquids in total to the organic solvents in total is for instance from about 99.5/0.5 to about 0.5/99.5, from about 99/1 to about 1/99, from about 95/5 to about 5/95, from about 90/10 to about 10/90, from about 80/20 to about 20/80, from about 70/30 to about 30/70 or from about 60/40 to about 40/60.

E23. A battery according to any of the preceding embodiments where the electrolyte composition contains one or more additives, for instance one or more additives selected from the group consisting of corrosion inhibitors, solid electrolyte interface (SEI) improvers, proton evolution improvers, self-discharge inhibitors, anti-gassing agents, viscosity adjusting agents, cathode protection agents, salt stabilizers, conductivity improvers and solvating agents.

E24. A battery according to any of the preceding embodiments where the electrolyte composition contains one or more additives selected from the group consisting of fluorinated oil, sodium stannate, sodium citrate or polyacrylic acids;

HF or KF, oxides or hydroxides of rare earths such as Y, metal porphines, for example Ni or Fe porphine, vinylene carbonate, vinylethylene carbonate, methylene ethylene carbonate or fluoro-ethylene carbonate;

polyglycols, polyglycol alkyl ethers, polyglycol alkyl phosphate esters or polysorbates such as polyethylene glycol (PEG), polypropylene glycol, polysorbate 20, polysorbate 40 or polysorbate 80 or a mixture of PEG 600 and polysorbate 20 or a mixture of PEG 600 and ZnO;

phosphate ester-based surfactants, propane sultone or fluoropropane sultone; and

DMSO;

for example at a level of from about 0.1% to about 15% by weight, based on the total weight of the electrolyte composition.

E25. A battery according to any of the preceding embodiments where the positive electrode comprises one or more cathode active materials selected from the group consisting of transition metals, transition metal oxides, transition metal hydroxides, transition metal oxide/hydroxides and transition metal fluorides.

E26. A battery according to any of the preceding embodiments where the positive electrode comprises one or more cathode active materials selected from the group consisting of transition metals, transition metal oxides, transition metal hydroxides, transition metal oxide/hydroxides and transition metal fluorides, where in the metal oxides, metal hydroxides and metal oxide/hydroxides, nickel may be present at a level of ≤5, ≤10, ≤15, ≤20, ≤25, ≤30, ≤35, ≤40, ≤45, ≤50, ≤55, ≤60, ≤65, ≤70, ≤75, ≤80 or ≤85 atomic percent, for instance ≤90 atomic percent, based on the total metals of the metal oxides, metal hydroxides and metal oxide/hydroxides.

E27. A battery according to any of the preceding embodiments where the positive electrode comprises one or more cathode active materials selected from the group consisting of transition
metals, transition metal oxides, transition metal hydroxides, transition metal oxide/hydroxides and transition metal fluorides; for example, one or more cathode active materials selected from the group consisting of
Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;
oxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;
hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au;
oxide/hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au and
fluorides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au.

EXAMPLES

In the following examples, all measurements are performed at ambient conditions of 25° C. and 1 atm, unless specified otherwise.

Example 1

Electrolyte Compositions Comprising Ionic Liquid and Acetic Acid

Electrolyte compositions are prepared by mixing ionic liquids with acetic acid (AA). Acetic acid concentration is reported in mol/L (M) in the ionic liquid. Conductivity of each composition is measured and reported in mS/cm at 25° C. Results are below.

| | conductivity (mS/cm) | | | | | |
|---|---|---|---|---|---|---|
| AA (M) | DEMA TfO | EMIM TFSI | EMIM TfO | BMIM TFSI | BMIM Ac | BMIM TfO |
| 0 | 9.0 | 8.8 | 9.4 | 3.8 | 0.8 | 3.8 |
| 0.5 | 9.6 | 9.8 | 10.0 | 4.5 | 1.0 | 3.5 |
| 1.0 | 10.5 | 10.5 | 10.6 | 5.1 | 1.4 | 4.0 |
| 2.0 | 11.8 | 11.4 | 11.6 | 5.9 | 2.2 | 4.8 |
| 4.0 | 13.4 | 12.6 | 13.2 | 7.0 | 4.0 | 6.3 |
| 6.0 | 14.3 | 13.2 | 13.9 | 7.9 | 5.2 | 7.5 |

DEMA TfO: diethylmethylammonium trifluoromethanesulfonate
EMIM TFSI: 1-ethyl-3-methylimidazolium bis(trifluoromethylsulfonyl)imide
EMIM TfO: 1-ethyl-3-methylimidazolium trifluoromethanesulfonate
BMIM TFSI: 1-butyl-3-methylimidazolium bis(trifluoromethylsulfonyl)imide
BMIM Ac: 1-butyl-3-methylimidazolium acetate
BMIM TfO: 1-butyl-3-methylimidazolium trifluoromethanesulfonate It is seen that the presence of acetic acid in an ionic liquid leads to increased conductivity.

The electrolyte compositions are employed in a SWA-GELOK cell assembly. A smaller anode is employed and therefore limits the capacity. Specific capacity is calculated based on the weight of the anode active material. The anode contains an $AB_5$ rare earth/nickel based metal hydride active material. The cathode contains $Ni(OH)_2$ active material and the separator is a conventional non-woven material.

Pure ionic liquids exhibit poor cell performance. Electrolyte compositions comprising an ionic liquid and 1 M acetic acid show improved cell performance. The compositions containing BMIM Ac especially show very good performance in terms of charge/discharge overpotentials and cycle stability.

Example 2

Electrolyte Composition Comprising Ionic Liquid and Solvent

A 1:1 volume mixture of 1-ethyl-3-methylimidazolium acetate (EMIM Ac) and methanol is prepared and tested in a cell as an electrolyte as in Example 1. A discharge capacity of 78 mAh/g is obtained for a charge capacity of 400 mAh/g.

Example 3

Electrolyte Compositions Comprising Ionic Liquid and Protic Acid

Electrolyte compositions of 1 M $H_3PO_4$ in EMIM TFSI, EMIM TfO and DEMA TfO are prepared. The electrolytes are tested in a cell as in Example 1. The cells exhibit good charge/discharge characteristics. The example is repeated replacing phosphoric acid with each of citric acid, acrylic acid, methanesulfonic acid and oxalic acid.

Example 4

Electrolyte Composition Containing 2 M Acetic Acid in EMIM Ac

A charge/discharge test is performed employing 2 M acetic acid/EMIM Ac electrolyte composition in a cell as in Example 1. The NiMH cell is charged to 40 mAh/g and discharged until a cutoff voltage of 0.7 V. Several cycles are required to activate the cell. Charge voltage drops and specific capacity increases dramatically over the first 20 cycles. Coulombic efficiency reaches 70% at 23 cycles. The cell starts to degrade slightly after 50 cycles; after 147 cycles coulombic efficiency drops to 58%. The $AB_5$ anode exhibits a specific capacity of 178 mAh/g when the cell is charged with a capacity of 400 mAh/g.

Example 5

Cyclic Voltammetry

Cyclic voltammetry is performed for an $AB_5$ anode with a 2M acetic acid/EMIM Ac electrolyte and with a 30 weight percent (wt %) aqueous KOH electrolyte at variable scan rates after activation. The electrode potential is scanned from 0 V to −1.2 V vs. a Hg/HgO reference for KOH and from 0 V to −1.6 V vs. a commercial leak-free reference electrode for 2 M acetic acid/EMIM Ac electrolyte.

At a scan rate of 500 mV/s, the hydrogen adsorption peak for 30 wt % KOH is observed at about −1.1 V. For the acetic acid/EMIM Ac electrolyte, a hydrogen adsorption peak is observed at −0.95 V and a further peak is observed at −1.55 V. There is an extra 0.6 V voltage window for the present acetic acid/EMIM Ac electrolyte.

Example 6

Electrolyte Compositions Comprising Ionic Liquid and Solvent

Solutions of EMIM Ac and propylene carbonate (PC) are prepared and tested for conductivity. EMIM Ac levels are reported in volume % based on the EMIM Ac/PC mixture. Conductivity of each composition is measured and reported in mS/cm at 25° C. Results are below.

| volume % of EMIM Ac | conductivity (mS/cm) |
|---|---|
| 0 | 0.01 |
| 1.96 | 1.90 |
| 3.85 | 2.72 |
| 5.66 | 3.28 |
| 9.09 | 4.04 |
| 16.67 | 5.06 |
| 28.57 | 6.49 |
| 37.50 | 7.05 |
| 44.44 | 7.25 |
| 50.00 | 7.28 |
| 71.43 | 6.32 |
| 83.33 | 5.23 |
| 90.91 | 4.38 |
| 96.15 | 3.71 |
| 98.04 | 3.39 |
| 100 | 3.02 |

It is seen that a 1:1 volume mixture of an ionic liquid and PC is highly conductive.

Example 7

Ternary Electrolyte Composition Containing Ionic Liquid/Solvent/Protic Acid

Mixtures of acetic acid and 1-ethyl-3-methylimidazolium acetate (EMIM Ac) are prepared and tested for conductivity. The highest conductivity achieved is about 10.8 mS/cm for 1:1 weight mixture.

Electrolyte compositions are prepared by mixing acetic acid with 1:1 volume mixtures of EMIM Ac and propylene carbonate (PC). Acetic acid concentration is wt % based on the total mixture. Conductivity is measured and is reported below.

| acetic acid concentration (wt %) | conductivity (mS/cm) |
|---|---|
| 0 | 7.23 |
| 1.84 | 7.98 |
| 3.62 | 8.75 |
| 5.34 | 9.51 |
| 8.61 | 10.82 |
| 15.91 | 12.67 |
| 22.18 | 12.68 |
| 27.63 | 12.38 |
| 36.62 | 11.82 |
| 43.74 | 11.42 |
| 49.52 | 11.05 |

Electrolyte compositions are prepared by mixing methanesulfonic acid with 1:1 volume mixtures of EMIM Ac/PC. Methanesulfonic acid concentration is wt % based on the total mixture. Conductivity is measured and is reported below.

| MeSO$_3$H concentration (wt %) | conductivity (mS/cm) |
|---|---|
| 0 | 7.23 |
| 2.60 | 8.76 |
| 5.11 | 9.54 |
| 7.54 | 10.56 |
| 12.15 | 11.81 |
| 22.46 | 11.88 |
| 39.01 | 10.91 |
| 61.76 | 9.98 |

Electrolyte compositions are prepared by mixing acrylic acid with 1:1 volume mixtures of EMIM Ac/PC. Acrylic acid concentration is wt % based on the total mixture. Conductivity is measured and is reported below.

| acrylic acid concentration (wt %) | conductivity (mS/cm) |
|---|---|
| 0 | 7.23 |
| 1.85 | 7.83 |
| 3.63 | 8.35 |
| 8.62 | 9.85 |
| 15.94 | 11.32 |
| 27.68 | 11.14 |
| 43.82 | 9.28 |

It is seen that ternary electrolyte compositions containing ionic liquid, solvent and protic acid exhibit excellent conductivity.

The electrolyte composition of 15.91 wt % acetic acid in 1:1 volume mixture of EMIM Ac/PC is tested in a cell as in Example 1. At the first cycle, the ternary electrolyte exhibits a reduced charge/discharge overpotential vs. 2M acetic acid in EMIM Ac. The ternary system exhibits a 0.33 V drop in charge voltage and increased discharge voltage plateau. The ternary system also has an increased coloumbic efficiency of 32.9% (13.14/40 mAh/g) vs. 21.2% 6.16/29 mAh/g) for the binary system.

Example 8

Electrolyte Compositions Containing Ionic Liquid/Protic Acid and/or Solvent

Example 2 is repeated, replacing methanol with each of ethylene carbonate (EC), propylene carbonate (PC), 1,2-dimethyoxyethane (DME), dimethyl sulfoxide (DMSO), N,N-dimethylformamide (DMF), N, N-dimethylacetamide (DMA) and acetonitrile (AN).

Examples 6 and 7 are repeated, replacing PC with each of EC, methanol, DME, DMSO, DMF, DMA and acetonitrile.

The invention claimed is:

1. A metal hydride secondary battery comprising at least one negative electrode, at least one positive electrode, a casing having said electrodes positioned therein and an electrolyte composition, wherein:
   the negative electrode comprises ABx metal alloy capable of reversibly adsorbing and desorbing hydrogen; and
   the electrolyte composition comprises
   a) an ionic liquid and
   b) a protic acid selected from the group consisting of boric acid, hydrofluoric acid, hydrobromic acid, hydroiodic acid, perchloric acid, periodic acid; sodium bisulfate, potassium bisulfate, HAsF$_6$, HBF$_4$, H(OEt$_2$)BF$_4$, and HPF$_6$, or
   the protic acid selected from the group consisting of sulfonic acids of formula RSO$_3$H wherein R is alkyl or aryl or alkyl or aryl substituted by one to three halogens; [H(OEt$_2$)$_2$][B[3,5-(CF$_3$)$_2$C$_6$H$_3$]$_4$], [H(OEt$_2$)$_2$][B(C$_6$F$_5$)$_4$] and [H(OEt$_2$)$_2$][Al(OC(CF$_3$)$_3$)$_4$].

2. A battery according to claim 1, wherein the electrolyte composition comprises a protic acid wherein the weight/weight ratio of the ionic liquids in total to the protic acids in total is from about 99.5/0.5 to about 0.5/99.5.

3. A battery according to claim 1, wherein the electrolyte composition comprises an organic solvent wherein the weight/weight ratio of the ionic liquids in total to the organic solvents in total is from about 99.5/0.5 to about 0.5/99.5.

4. A battery according to claim 1, wherein the electrolyte composition comprises an ionic liquid, a protic acid and an organic solvent.

5. A battery according to claim 1, wherein the ionic liquid contains a cation selected from the group consisting of formulae (a)-(h)

 (a)

 (b)

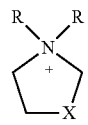 (c)

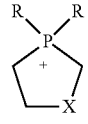 (d)

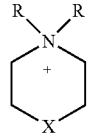 (e)

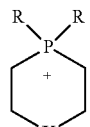 (f)

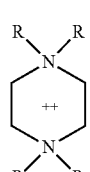 (g)

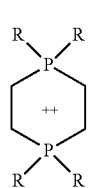 (h)

wherein
each R is independently H, C$_1$-C$_{16}$alkyl or hydroxyC$_1$-C$_{16}$alkyl, for instance methyl, ethyl, hydroxyethyl or propyl and
X is CH$_2$, O, S or NR wherein R is H or C$_1$-C$_{16}$alkyl, for instance H, methyl, ethyl or propyl.

6. A battery according to claim 1, wherein the ionic liquid contains an anion selected from the group consisting of carboxylates, imides, methides, nitrate, bifluoride, halides, borates, phosphates, phosphinates, phosphonates, sulfonates, sulfates, carbonates and aluminates.

7. A battery according to claim 1, wherein the ionic liquid contains an anion selected from the group consisting of F$_2$P(C$_2$F$_5$)$_4^-$, F$_3$P(C$_2$F$_5$)$_3^-$, F$_4$P(C$_2$F$_5$)$_2^-$, F$_2$P(C$_3$F$_7$)$_4^-$, F$_3$P(C$_3$F$_7$)$_3^-$, F$_4$P(C$_3$F$_7$)$_2^-$, F$_2$P(C$_4$F$_9$)$_4^-$, F$_3$P(C$_4$F$_9$)$_3^-$, F$_4$P(C$_4$F$_9$)$_2^-$, perfluoroalkylcarboxylate, perfluoroalkylsulfonate, bis(perfluoroalkylsulfonyl)imide, (perfluoroalkylsulfonyl)(perfluoroalkylcarboxyl)imide, tris(perfluoroalkylsulfonyl)methide, trifluoroacetate, trifluoromethanesulfonate (triflate), bis(trifluoromethylsulfonyl)imide, tris(trifluoromethylsulfonyl)methide, tetrafluoroborate, spiro-oxo borates and spiro-oxo phosphates.

8. A battery according to claim 1, wherein the ionic liquid contains a carboxylate anion of formula RCOO$^-$ wherein R is hydrogen or hydrocarbyl.

9. A battery according to claim 1, wherein the ionic liquid contains an anion selected from the group consisting of dicyanamide, N(SO$_2$F)$_2^-$, a bis(perfluoroalkylsulfonyl)imide, bis(pentafluoroethylsulfonyl)imide, N(CF$_3$SO$_2$)(CF$_3$(CF$_2$)$_3$SO$_2$)$^-$, a (perfluoroalkylsulfonyl)(perfluoroalkylcarboxyl)imide; a tris(perfluoroalkylsulfonyl)methide; bifluoride; chloride, bromide, iodide, fluoride; orthoborate, tetrahydroxyborate, tetraborate, tetraphenylborate, [B(3,5-(CF$_3$)$_2$C$_6$H$_3$)$_4$]$^-$, B(C$_2$O$_4$)$_2^-$(bis(oxalato)borate), difluoro(oxalato)borate, di(trifluoroacetato)oxalatoborate, B(C$_6$F$_5$)$_4^-$, BF$_4^-$; dihydrogen phosphate, hydrogen phosphate, alkyl phosphate, dialkyl phosphate, phosphate, PF$_6^-$, HPO$_3$F$^-$, trisoxalatophosphate, tetrafluorooxalatophosphate, a fluoro(perfluoroalkyl)phosphate; an alkylsulfonate, an arylsulfonate, a perfluoroalkylsulfonate; hydrogensulfate, sulfate, thiosulfate, an alkylsulfate; carbonate, hydrogencarbonate, an alkylcarbonate; Al(OC(CF$_3$)$_3$)$_4^-$, di(trifluoroacetato)oxalatoaluminate, tetrachloroaluminate, tetrafluoroaluminate, tetraiodoaluminate and tetrabromoaluminate.

10. A battery according to claim 1, wherein the ionic liquid is selected from the group consisting of diethylmethylammonium trifluoromethanesulfonate, ethylammonium nitrate, triethylammonium methanesulfonate, 2-methylpyridinium trifluoromethanesulfonate, ammonium fluoride, methylammonium nitrate, hydroxyethylammonium nitrate, ethylammonium nitrate, dimethylammonium nitrate, 1-methylimidazolium nitrate, 1-ethylimidazolium nitrate, t-butylammonium tetrafluoroborate, hydroxyethylammonium tetrafluoroborate, methylbutylammonium tetrafluoroborate, triethylammonium tetrafluoroborate, imidazolium tetrafluoroborate, 1-methylimidazolium tetrafluoroborate, 1,2-dimethylimidazolium tetrafluoroborate, t-butylammonium triflate, 2-fluoropyridinium triflate, hydroxyethylammonium triflate, 1,2-dimethylimidazolium triflate, imidazolium triflate, 1-methylimidazolium hydrogensulfate, 1-methylimidazolium chloride, 1-methylimidazolium triflate, hydronium triflate, methylammonium mesylate, ethylammonium mesylate, butylammonium mesylate, methoxyethylammonium mesylate, dimethylammonium mesylate, dibutylammonium mesylate, triethylammonium mesylate, dimethylethylammonium mesylate, hydronium hydrogensulfate, ammonium hydrogensulfate, methylammonium hydrogensulfate, ethylammonium hydrogensulfate, propylammonium hydrogensulfate, n-butylammonium hydrogensulfate, t-butylammonium hydrogensulfate, dimethylammonium hydrogensulfate, diethylammonium hydrogensulfate, di-n-butylammonium hydrogensulfate, methylbutylammonium hydrogensulfate, ethylbutylammonium hydrogensulfate, trimethylammonium hydrogensulfate, triethylammonium hydrogensulfate, tributylammonium hydrogensulfate, dimethylethylammonium hydrogensulfate, dibutylammonium fluorohydrogen phosphate, triethylammonium fluorohydrogen phosphate, tributylammonium fluorohydrogen phosphate, hydronium dihydrogen phosphate, methylammonium dihydrogen phosphate, ethylammonium dihydrogen phosphate, propylammonium dihydrogen phosphate, n-butylammonum dihydrogen phosphate, methoxyethylammonium dihydrogen phosphate, dimethylammonium dihydrogen phosphate, dibutylammonium dihydrogen phosphate, methylbutylammonium dihydrogen phosphate, ammonium bifluoride, methylammonium bifluoride, ethylammonium bifluoride, dimethylammonium bifluoride, 1-ethyl-3-methylimidazolium trifluoromethanesulfonate, 1-ethyl-3-methylimidazolium tetrafluoroborate, 1-ethyl-3-methylimidazolium bis(trifluoromethylsulfonyl)imide, 1-ethyl-3-methylimidazolium acetate, 1-butyl-3-methylimidazolium trifluoromethanesulfonate, 1-butyl-3-methylimidazolium acetate, 1-butyl-3-methylimidazolium bis(trifluoromethylsulfonyl)imide, tri-n-butylmethylammonium methylsulfate, 1-ethyl-2,3-dimethylimidazolium ethylsulfate, 1-butyl-3-methylimidazolium thiocyanate, 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogencarbonate, 1-butyl-3-methylimidazolium hydrogensulfate, 1-butyl-3-methylimidazolium chloride, 1,2,3-trimethylimidazolium methylsulfate, tris-(hydroxyethyl)methylammonium methylsulfate, 1,2,4-trimethylpyrazolium methylsulfate, 1,3-dimethylimdiazolium hydrogencarbonate, 1-ethyl-3-methylimidazolium hydrogencarbonate, 1-ethyl-3-methylimidazolium chloride, 1-ethyl-3-methylimidazolium tetrachloroaluminate, 1-ethyl-3-methylimidazolium thiocyanate, 1-ethyl-3-methylimidazolium methanesulfonate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium hexafluorophosphate, 1-butyl-3,5-dimethylpyridinium bromide, 1-ethyl-3-methylimidazolium bis(pentafluoroethylsulfonyl)imide, 1-ethyl-2,3-dimethylimidazolium methylcarbonate, carboxymethyl-tributylphosphonium bis(trifluoromethylsulfonyl)imide, N-carboxymethyl-methylpyrrolidinium bis(trifluoromethylsulfonyl)imide, N-carboxymethyl-trimethylammonium bis(trifluoromethylsulfonyl)imide, N-carboxymethyl-methylpyridinium bis(trifluoromethylsulfonyl)imide, hexyltrimethylammonium bis(trifluromethylsulfonyl)imide, tetrabutylphosphonium methanesulfonate, triethylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylphosphonium dibutylphosphate, triethylmethylphosphonium dibutylphosphate, tetrabutylphosphonium tetrafluoroborate, tetrabutylphosphonium p-toluenesulfonate, tributylmethylphosphonium methylcarbonate, 1-ethyl-3-methylimidazolium hydrogencarbonate, tributylmethylammonium methylcarbonate, tributylmethylammonium dibutylphosphate, 1-ethyl-3-methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl)pyridinium chloride, 1-(3-cyanopropyl)pyridinium bis(trifluoromethylsulfonyl)imide, 1,3-bis(cyanomethyl) imidazolium chloride, 1,3-bis(cyanomethyl)imidazolium bis(trifluoromethylsulfonyl)imide, 1,3-bis(cyanopropyl) imidazolium chloride, 1,3-bis(3-cyanopropyl)imidazolium bis(trifluoromethylsulfonyl)imide, 1-butyl-3-methylimidazolium hexafluorophosphate, 1-butyl-3-methylimidazolium tetrafluoroborate, 1-ethyl-3-methylimidazolium tetrafluoroborate, 1-ethyl-3-methylimidazolium chloride, 1-ethyl-3-methylimidazolium bromide, 1-butyl-3-methylimidazolium bromide, 1-hexyl-3-methylimidazolium chloride, tributylmethylphosphonium methylsulfate, triethylmethylphosphonium dibutylphosphate, trihexyltetradecylphosphonium bis(trifluromethylsulfonyl)imide, trihexyltetradecylphosphonium bis(2,4,4-trimethylphenyl) phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate and 3-(triphenylphosphonio)propane-1- sulfonic acid tosylate.

11. A battery according to claim 4, wherein the electrolyte composition comprises an organic solvent selected from the group consisting of organic carbonates, ethers, glymes, ortho esters, polyalkylene glycols, esters, lactones, glycols, formates, sulfones, sulfoxides, amides, alcohols, ketones, nitro solvents, nitrile solvents and combinations thereof.

12. A battery according to claim 4, wherein the electrolyte composition comprises an organic solvent selected from the group consisting of ethylene carbonate, propylene carbonate, trimethylene carbonate, 1,2-butylene carbonate, dimethyl carbonate, diethyl carbonate, ethylmethyl carbonate, vinylene carbonate, difluoroethylene carbonate, monofluoroethylene carbonate; dimethoxymethane, diethoxymethane, 1,2-dimethoxyethane, diglyme, triglyme, tetraglyme, ethyleneglycol diethylether, ethyleneglycol dibutylether, diethyleneglycol diethylether, tetrahydrofuran, 2-methyltetrahydrofuran, 1,3-dioxane, 1,3-dioxolane, 4-methyl-1,3-dioxolane, 2-methyl-1,3-dioxolane, 1,4-dioxane, dimethylether, ethylmethylether, diethylether, di-n-butylether, di-t-butylether, di-isopropylether, methyl-t-butylether, ethyl-t-butylether, t-amyl-methylether; trimethoxymethane, triethoxymethane, 1,4-dimethyl-3,5,8-trioxabicyclo[2.2.2] octane, 4-ethyl-1-methyl-3,5,8-trioxabicyclo[2.2.2]octane; polyethylene glycol or monomethyl, dimethyl or diethyl polyethylene glycol with weight average molecular weights from about 200 to about 1200 g/mol; γ-butyrolactone, γ-valerolactone, δ-valerolactone, ethyl acetate, 2-methoxyethyl acetate, 2-ethoxyethyl acetate, 2-butoxyethyl acetate, 2-(2-butoxyethoxy)ethyl acetate, ethylene glycol diacetate, 3-ethoxy ethyl propionate, methyl butyrate, n-amyl acetate, propylene glycol methyl ether acetate, ethyl butyrate, diethyl malonate, dimethyl malonate; methyl esters of adipic, glutaric or succinic acids; ethylene glycol, propylene glycol, 2-methoxyethanol, 2-ethoxyethanol, 2-propoxyethanol, 2-isopropoxyethanol, 2-butoxyethanol, 2-phenoxyethanol, 2-benzyloxyethanol, 2-(2-methoxyethoxy)ethanol, 2-(2-ethoxyethoxy)ethanol, 2-(2-butoxyethoxy)ethanol, propylene glycol butyl ether, propylene glycol methyl ether, triethylene glycol, dipropylene glycol methyl ether, diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether or fluorinated diethylene glycol butyl ether; methyl formate, ethyl formate, isobutyl formate, tert-butyl formate; methylsulfonylmethane, ethylmethylsulfone, sulfolane, dimethylsulfoxide; dimethylformamide, dimethylacetamide, N-methylpyrrolidone (NMP), 2-pyrrolidone, 1,3-dimethyl-2-imidazolidinone, hexamethylphosphoramide, N,N'-dimethyl-N,N'-trimethyleneurea; benzylalcohol, ethanol, trifluoroethanol, methanol, isopropanol, t-butanol, n-butanol; methylethylketone, methyl-isoamylketone; nitrobenzene, nitromethane, nitroethane; acetonitrile, propionitrile, butyronitrile and adiponitrile.

13. A battery according to claim 1, wherein the electrolyte composition contains ≤10 ppm water by weight, based on the total weight of the electrolyte composition.

14. A battery according to claim 1, wherein the electrolyte composition contains one or more additives selected from the group consisting of corrosion inhibitors, solid electrolyte interface improvers, proton evolution improvers, self-discharge inhibitors, anti-gassing agents, viscosity adjusting agents, cathode protection agents, salt stabilizers, conductivity improvers and solvating agents.

15. A metal hydride battery according to claim 1, wherein the battery exhibits a nominal open-circuit voltage of >1.2 V and up to about 6 V.

16. A metal hydride battery according to claim 1, wherein the positive electrode comprises one or more cathode active materials selected from the group consisting of transition metals, transition metal oxides, transition metal hydroxides, transition metal oxide/hydroxides and transition metal fluorides;
wherein in the metal oxides, metal hydroxides and metal oxide/hydroxides, nickel is present at a level of ≤80 atomic percent, based on the total metals of the metal oxides, metal hydroxides and metal oxide/hydroxides.

17. A metal hydride battery according to claim 16, wherein the positive electrode comprises one or more cathode active materials selected from the group consisting of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au; oxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au; hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au; oxide/hydroxides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au and fluorides of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt or Au.

18. A battery according to claim 1, wherein the ionic liquid is selected from the group consisting of 1-butyl-3-methylimidazolium tetrachloroaluminate, 1-butyl-3-methylimidazolium methylsulfate, 1-butyl-3-methylimidazolium methanesulfonate, 1-butyl-3-methylimidazolium hydrogencarbonate, 1-butyl-3-methylimidazolium hydrogensulfate, 1-butyl-3-methylimidazolium chloride, 1,2,3-trimethylimidazolium methylsulfate, tris(hydroxyethyl)methylammonium methylsulfate, 1,2,4-trimethylpyrazolium methylsulfate, 1,3-dimethylimdiazolium hydrogencarbonate, 1-ethyl-3-methylimidazolium hydrogencarbonate, 1-ethyl-3-methylimidazolium chloride, 1-ethyl-3-methylimidazolium tetrachloroaluminate, 1-ethyl-3-methylimidazolium thiocyanate, 1-ethyl-3-methylimidazolium methanesulfonate, 1-ethyl-3-methylimidazolium hydrogensulfate, 1-ethyl-3-methylimidazolium ethylsulfate, 1-ethyl-3-methylimidazolium nitrate, 1-butylpyridinium chloride, 1-ethyl-3-methylimidazolium dicyanamide, 1-ethyl-3-methylimidazolium hexafluorophosphate, 1-butyl-3,5-dimethylpyridinium bromide, 1-ethyl-3-methylimidazolium bis(pentafluoroethylsulfonyl)imide, 1-ethyl-2,3-dimethylimidazolium methylcarbonate, carboxymethyl-tributylphosphonium bis(trifluoromethylsulfonyl)imide, N-carboxyethyl-methylpyrrolidinium bis(trifluoromethylsulfonyl)imide, N-carboxymethyltrimethylammonium bis(trifluoromethylsulfonyl)imide, N-carboxymethyl-methylpyridinium bis(trifluoromethylsulfonyl)imide, hexyltrimethylammonium bis(trifluromethylsulfonyl)imide, tetrabutylphosphonium methanesulfonate, triethylmethylammonium methylcarbonate, 1-ethyl-1-methylpiperidinium methylcarbonate, 4-ethyl-4-methylmorpholinium methylcarbonate, 1-butyl-1-methylpyrrolidinium methylcarbonate, triethylmethylammonium dibutylphosphate, tributylmethylphosphonium dibutylphosphate, triethylmethylphosphonium dibutylphosphate, tetrabutylphosphonium tetrafluoroborate, tetrabutylphosphonium p-toluenesulfonate, tributylmethylphosphonium methylcarbonate, 1-ethyl-3-methylimidazolium hydrogencarbonate, tributylmethylammonium methylcarbonate, tributylmethylammonium dibutylphosphate, 1-ethyl-3- methylimidazolium dibutylphosphate, 1-butyl-3-methylimidazolium dibutylphosphate, 1-(cyanomethyl)-3-methylimidazolium chloride, 1-(3-cyanopropyl)-3-methylimidazolium chloride, 1-(3-cyanopropyl)-3-methylimidazolium bis(trifluoromethylsulfonyl)imide, 1-(3-cyanopropyl)-3-methylimidazolium dicyanamide, 1-(3-cyanopropyl)pyridinium chloride, 1-(3-cyanopropyl)pyridinium bis(trifluoromethylsulfonyl)imide, 1,3-bis(cyanomethyl)imidazolium chloride, 1,3-bis(cyanomethyl)imidazolium bis(trifluoromethylsulfonyl)imide, 1,3-bis(cyanopropyl)imidazolium chloride, 1,3-bis(3-cyanopropyl)imidazolium bis(trifluoromethylsulfonyl)imide, 1-butyl-3-methylimidazolium hexafluorophosphate, 1-butyl-3- methylimidazolium tetrafluoroborate, 1-ethyl-3-methylimidazolium tetrafluoroborate, 1-ethyl-3- methylimidazolium chloride, 1-ethyl-3-methylimidazolium bromide, 1-butyl-3-methylimidazolium bromide, 1-hexyl-3-methylimidazolium chloride, tributylmethylphosphonium methylsulfate, triethylmethylphosphonium dibutylphosphate, trihexyltetradecylphosphonium bis(trifluromethylsulfonyl)imide, trihexyltetradecylphosphonium bis(2,4,4-trimethylphenyl)phosphinate, trihexyltetradecylphosphonium bromide, trihexyltetradecylphosphonium chloride, trihexyltetradecylphosphonium decanoate, trihexyltetradecylphosphonium dicyanamide, 3-(triphenylphosphonio)propane-1-sulfonate and 3-(triphenylphosphonio)propane-1-sulfonic acid tosylate.

19. A battery according to claim 1, wherein the electrolyte composition comprises an organic solvent selected from the group consisting of methyl esters of adipic, glutaric or succinic acids, ethylene glycol, propylene glycol, 2-methoxyethanol, 2-ethoxyethanol, 2-propoxyethanol, 2-isopropoxyethanol, 2-butoxyethanol, 2-phenoxyethanol, 2-benzyloxyethanol, 2-(2-methoxyethoxy)ethanol, 2-(2-ethoxyethoxy)ethanol, 2-(2-butoxyethoxy)ethanol, propylene glycol butyl ether, propylene glycol methyl ether, triethylene glycol, dipropylene glycol methyl ether, diethylene glycol methyl ether, 1,3-butanediol, 1,4-butanediol, 1,5-pentanediol, perfluoro-1,4-butanediol, perfluoro-1,5-butanediol, fluorinated diethylene glycol methyl ether, fluorinated triethylene glycol, fluorinated triethylene glycol methyl ether or fluorinated diethylene glycol butyl ether, methyl formate, ethyl formate, isobutyl formate, tert-butyl formate, methylsulfonylmethane, ethylmethylsulfone, sulfolane, dimethylsulfoxide, dimethylformamide, dimethylacetamide, N-methylpyrrolidone (NMP), 2-pyrrolidone, 1,3-dimethyl-2-imidazolidinone, hexamethylphosphoramide, N,N'-dimethyi-N,N'-trimethyleneurea, benzylalcohol, ethanol, trifluoroethanol, methanol, isopropanol, t-butanol, n-butanol, methylethylketone, methyl-isoamylketone, nitrobenzene, nitromethane, nitroethane, acetonitrile, propionitrile, butyronitrile and adiponitrile.

20. A metal hydride battery comprising at least one negative electrode, at least one positive electrode, a casing having said electrodes positioned therein and an electrolyte composition, wherein
- the negative electrode comprises an ABx metal alloy capable of reversibly adsorbing and desorbing hydrogen;
- the positive electrode comprises one or more cathode active materials selected from the group consisting of transition metals, transition metal oxides, transition metal hydroxides, transition metal oxide/hydroxides and transition metal fluorides;
- wherein the metal oxides, metal hydroxides and metal oxide/hydroxides, nickel is present at a level of <80 atomic percent, based on the total metals of the metal oxides, metal hydroxides and metal oxide/hydroxides; and
- wherein the electrolyte composition comprises a) an ionic liquid and b) a protic acid selected from the group consisting of boric acid, hydrofluoric acid, hydrobromic acid, hydroiodic acid, perchloric acid, periodic acid; sodium bisulfate, potassium bisulfate, $HAsF_6$, $HBF_4$, $H(OEt_2)BF_4$, and $HPF_6$, or
- the protic acid selected from the group consisting of sulfonic acids of formula $RSO_3H$ wherein R is alkyl or aryl or alkyl or aryl substituted by one to three halogens; $[H(OEt_2)_2][B[3,5-(CF_3)_2C_6H_3]_4]$, $[H(OEt_2)_2][B(C_6F_5)_4]$ and $[H(OEt_2)_2][Al(OC(CF_3)_3)_4]$.

21. A battery according to claim 20, wherein the cathode active materials are selected from the group consisting of Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt Au, oxides thereof, hydroxides thereof, oxide/hydroxides thereof and fluorides thereof.

22. A battery according to claim 20, wherein the electrolyte composition comprises an ionic liquid, a protic acid and an organic solvent.

23. A battery according to claim 20, wherein the battery exhibits a nominal open-circuit voltage of >1.2 V (volts) and up to about 6 V.

* * * * *